United States Patent
Ikeuchi et al.

(10) Patent No.: US 7,816,301 B2
(45) Date of Patent: Oct. 19, 2010

(54) AQUEOUS-LIQUID-ABSORBING AGENT AND ITS PRODUCTION PROCESS

(75) Inventors: Hiroyuki Ikeuchi, Hyogo (JP); Shigeru Sakamoto, Hyogo (JP); Sayaka Machida, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/088,354

(22) PCT Filed: Sep. 25, 2006

(86) PCT No.: PCT/JP2006/319626

§ 371 (c)(1),
(2), (4) Date: Jun. 17, 2008

(87) PCT Pub. No.: WO2007/037453

PCT Pub. Date: Apr. 5, 2007

(65) Prior Publication Data

US 2009/0131255 A1    May 21, 2009

(30) Foreign Application Priority Data

Sep. 30, 2005    (JP) .......................... 2005-289397

(51) Int. Cl.
*B01J 20/26* (2006.01)
*B01J 20/00* (2006.01)
*B01J 20/02* (2006.01)

(52) U.S. Cl. .................. 502/402; 502/400; 502/401; 502/403; 502/404

(58) Field of Classification Search .......... 502/400–409
See application file for complete search history.

(56) References Cited

U.S. PATENT DOCUMENTS

| 2005/0113252 A1* | 5/2005 | Miyake et al. ............. 502/402 |
| 2007/0161759 A1 | 7/2007 | Riegel et al. |
| 2007/0202772 A1 | 8/2007 | Ikeuchi et al. |

FOREIGN PATENT DOCUMENTS

| CA | 2 370 380 A1 | 10/2000 |
| CA | 2 433 044 | 7/2002 |
| EP | 1 518 566 A1 | 3/2005 |
| EP | 1 518 567 A1 | 3/2005 |
| JP | 2000-143722 | 5/2000 |
| JP | 2002-542364 | * 12/2002 |
| JP | 2002542364 | 12/2002 |

(Continued)

*Primary Examiner*—Timothy C Vanoy
*Assistant Examiner*—Daniel Berns
(74) *Attorney, Agent, or Firm*—Roylance, Abrams, Berdo & Goodman, L.L.P.

(57) ABSTRACT

The present invention provides an aqueous-liquid-absorbing agent which comprises water-absorbent resin particles as essential components and is suitable for uses in sanitary materials. The aqueous-liquid-absorbing agent according to the present invention is an aqueous-liquid-absorbing agent comprising water-absorbent resin particles as essential components, wherein the water-absorbent resin particles are obtained by a process including the step of polymerizing a water-soluble ethylenically unsaturated monomer having a carboxyl group, and have a crosslinked structure in their inside, the aqueous-liquid-absorbing agent exhibiting a water absorption capacity (CRC) of 5 to 25 g/g and a saline flow conductivity (SFC) of not less than 1216 $cm^3 \cdot s \cdot 10^{-7}/g$.

4 Claims, 2 Drawing Sheets

FOREIGN PATENT DOCUMENTS

| | | |
|---|---|---|
| WO | WO 95/26209 A1 | 10/1995 |
| WO | WO 00/63295 * | 10/2000 |
| WO | WO 02/053199 | 7/2002 |
| WO | WO 2005/008479 | 9/2005 |
| WO | WO 2005/080479 | 9/2005 |
| WO | WO 2005/097313 A1 | 10/2005 |

* cited by examiner

AQUEOUS-LIQUID-ABSORBING AGENT AND ITS PRODUCTION PROCESS

TECHNICAL FIELD

The present invention relates to an aqueous-liquid-absorbing agent and its production process. More specifically, the present invention relates to an aqueous-liquid-absorbing agent and its production process, wherein the aqueous-liquid-absorbing agent is used favorably for sanitary materials such as diapers.

BACKGROUND ART

Hitherto, water-absorbent resins have been large in absorption rate, absorption amount, and retention for aqueous liquids and therefore, for the purpose of absorption of body fluids, utilized as components of absorbent structures of the sanitary materials such as diapers by, if necessary, being mixed with fibrous materials such as cellulose fiber, polyester fiber, polyethylene fiber, and/or polypropylene fiber.

In recent years, the ratios of the water-absorbent resins in the absorbent structures tend to increase with the increasing needs of the thinning of the sanitary materials such as diapers (e.g. refer to patent document 1 below). For realization of thinner sanitary materials, it is desired that the fiber materials are replaced with water-absorbent resins for further increase in ratio of the water-absorbent resins in the absorbent structures.

The water-absorbent resin is inherently excellent in the performances of absorbing and retaining the aqueous liquid. However, the fibrous materials are poor in these performances, particularly the performance of retaining the aqueous liquid, and have different performances from those of the conventional water-absorbent resin. As such, as a future water-absorbent resin that responds to the needs, water-absorbent resins having the performances of the fibrous materials in the conventional absorbent structures must be developed. Examples of the performances demanded to such a water-absorbent resin having the performances of the fibrous materials include: a performance of rapidly absorbing an aqueous liquid; a performance of diffusing the aqueous liquid after having absorbed it; and a performance of being capable of temporarily retaining the aqueous liquid after having absorbed it. Therefore, the development of a water-absorbent resins having these performances has been desired.

As an example of such a water-absorbent resin, there has been reported a water-absorbent resin which is not subjected to surface-crosslinking, but coated with cationic polymer forming no covalent bonds on the surface of the water-absorbent resin, so as to realize a low absorption capacity and enhanced liquid-permeability, absorption rate, and wet porosity (see Patent Documents 2 and 3, for example).

[Patent Document 1] pamphlet of WO 95/26209
[Patent Document 2] Specification of European patent application publication No. 1518566
[Patent Document 3] Specification of European patent application publication No. 1518567

DISCLOSURE OF INVENTION

As described previously, the water-absorbent resin disclosed in each of Patent Documents 2 and 3 is attained by being coated with the cationic polymer forming no covalent bonds on the surface of the water-absorbent resin, without being subjected to surface-crosslinking. However, the technique of coating the water-absorbent resin with the cationic polymer has the disadvantages that the cationic polymer itself is expensive and that it is difficult to uniformly coat the water-absorbent resin with the cationic polymer because of its high viscosity. Further, the technique can generally cause the problems such as adhesion, cohesion, coloring, and lowered fluidity of the water-absorbent resin particles after coating treatment. The problems associated with such a water-absorbent resin are likely to be issues in terms of reduction in thickness of sanitary materials such as diapers and enhancement of the concentration of a water-absorbent resin in the sanitary materials.

An object of the present invention is to provide an aqueous-liquid-absorbing agent which is suitable for realization of thinner sanitary materials such as diapers and contains a water-absorbent resin as an essential component, and its production process. That is, an object of the present invention is to provide an aqueous-liquid-absorbing agent having the performances of the fibrous materials i.e. the performance of rapidly absorbing an aqueous liquid; the performance of diffusing the aqueous liquid after having absorbed it; and the performance of being capable of temporarily retaining the aqueous liquid after having absorbed it, and being suitable for the uses of the sanitary materials and for other uses.

The aqueous-liquid-absorbing agent of the present invention, in order to solve the above problem, is an aqueous-liquid-absorbing agent containing water-absorbent resin particles as essential components, wherein the water-absorbent resin particles are obtained by a process including the step of polymerizing a water-soluble ethylenically unsaturated monomer having a carboxyl group, have a crosslinked structure in their inside, and are surface-crosslinked, the aqueous-liquid-absorbing agent being characterized by exhibiting a water absorption capacity (CRC) of 5 to 25 g/g and a saline flow conductivity (SFC) of not less than 1216 $cm^3 \cdot s \cdot 10^{-7}/g$.

The aqueous-liquid-absorbing agent according to the present invention is favorably such that absorption rate (FSR) is not less than 0.1 g/g/s. Further, the aqueous-liquid-absorbing agent of the present invention is favorably such that a wet porosity is not less than 20%.

Still further, the aqueous-liquid-absorbing agent of the present invention is favorably a particulate shape and of which not less than 90 weight % is in the form of particles having particle diameters in the range of 150 to 850 μm. Yet further, it is favorably that at least a portion of the water-absorbent resin particles are agglomerate particles. The aqueous-liquid-absorbing agent of the present invention favorably further comprises a liquid-permeability-enhancing agent.

In order to solve the above problem, a process for production of an aqueous-liquid-absorbing agent, according to the present invention is a process for production of an aqueous-liquid-absorbing agent exhibiting a water absorption capacity (CRC) of 5 to 25 g/g and a saline flow conductivity (SFC) of not less than 1216 $cm^3 \cdot s \cdot 10^{-7}/g$, the process comprising the steps of: (a) polymerizing a water-soluble ethylenically unsaturated monomer having a carboxyl group in an aqueous monomer solution including the water-soluble ethylenically unsaturated monomer having a carboxyl group, in the presence of an internal-crosslinking agent having at least four functional groups each capable of forming a covalent bond with a carboxyl group to thereby obtain a hydropolymer; (b) drying the hydropolymer obtained in the step (a) at a temperature of not less than 150° C. to thereby obtain water-absorbent resin particles; and (c) surface-crosslinking the water-absorbent resin particles obtained in the step (b), wherein the amount (Y) (mol %) of the internal-crosslinking agent as used, relative to the water-soluble ethylenically unsaturated monomer having a carboxyl group, is expressed by the following equation (1): $Y \geq 0.06/\{2-(2.35X/100)\}$... (1) where X is neutralization degree (mol %) of a carboxyl group in the water-absorbent resin particles and is in the range of 45 to 85 mol %.

Further, the process for production of an aqueous-liquid-absorbing agent, according to the present invention, favorably further comprises the step of pulverizing the obtained hydropolymer or the obtained water-absorbent resin particles at least before or after the step (b).

Yet further, the process for production of an aqueous-liquid-absorbing agent, according to the present invention, is favorably such that at least a portion of the water-absorbent resin particles are agglomerate particles.

Further, the process for production of an aqueous-liquid-absorbing agent according to the present invention, favorably further comprises the step of subjecting the water-absorbent resin particles to treatment for liquid permeability enhancement before or after the step (c). The treatment for liquid permeability enhancement may be carried out by adding a liquid-permeability-enhancing agent. The liquid-permeability-enhancing agent is favorably at least one member selected from among water-soluble multivalent metal compounds and water-soluble polycationic compounds.

Still further, the process for production of an aqueous-liquid-absorbing agent, according to the present invention, is favorably such that the aqueous monomer solution has a monomer concentration of neither lower than 35 weight % nor higher than a saturated concentration.

As described above, the aqueous-liquid-absorbing agent of the present invention is an aqueous-liquid-absorbing agent containing water-absorbent resin particles as essential components having a crosslinked structure in their inside and being surface-crosslinked, the water-absorbent resin particles being obtained by a process including the step of polymerizing a water-soluble ethylenically unsaturated monomer, the aqueous-liquid-absorbing agent being characterized by exhibiting a water absorption capacity (CRC) of 5 to 25 g/g and a saline flow conductivity (SFC) of not less than 1216 $cm^3 \cdot s \cdot 10^{-7}/g$. Therefore, for example, if the absorbent structures in the sanitary materials such as diapers are constituted by containing the aqueous-liquid-absorbing agent according to the present invention, excellent liquid-permeability in a swollen gel can be obtained, and the aqueous liquid can be diffused through a still wider range. This makes it possible to replace fibrous materials used for the absorbent structures of the sanitary materials with aqueous-liquid-absorbing agent according to the present invention, which brings the significant improvements, such as thinner sanitary materials, in the uses of the sanitary materials and in other uses.

BEST MODE FOR CARRYING OUT THE INVENTION

Figure 1:
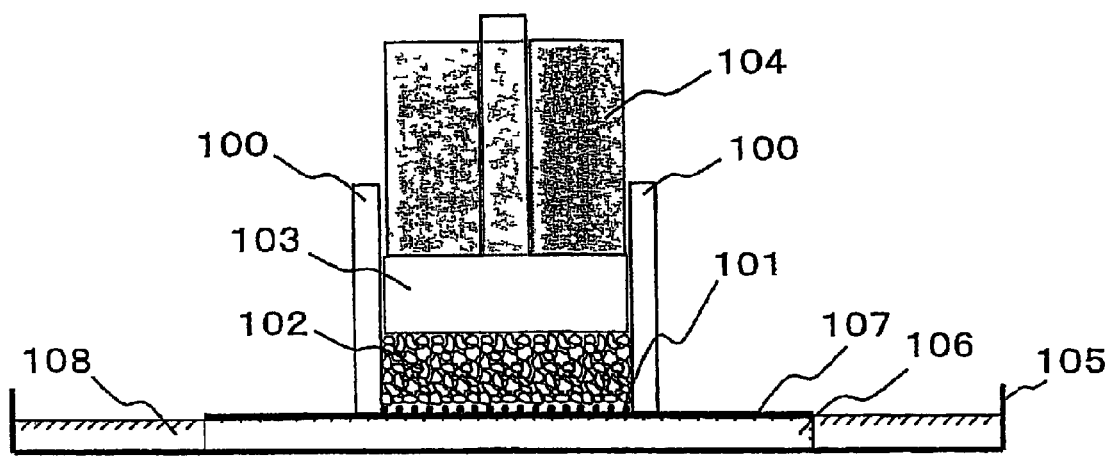
FIG. 1 is a schematic sectional view of a measurement apparatus as used for measuring the AAP.

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

In the present invention, assume that values of (a) water absorption capacity (CRC: Centrifuge Retention Capacity), (b) AAP (Absorbency Against Pressure), (c) absorption rate (FSR: Free Swell Rate), (d) SFC: Saline Flow Conductivity, (e) Wet Porosity, (f) particle diameter, (g) logarithmic standard deviation ($\sigma\zeta$) of particle diameter distribution, (h) Bulk density, and (i) extractable component content are obtained by the measurement methods described below in Examples. Note that in the present invention, "weight" is used as a synonym for "mass" and "weight %" is used as a synonym for "mass %".

The present inventors have decided to diligently study to solve the above problems. Then, the present inventors have become sure from their past experiences that the aqueous-liquid-absorbing agent to solve the above problems must comprise water-absorbent resin particles as essential components having a crosslinked structure in their inside, the water-absorbent resin particles being obtained by a process including the step of polymerizing a water-soluble ethylenically unsaturated monomer having a carboxyl group.

The water-absorbent resin is inherently excellent in the performances of absorbing and retaining the aqueous liquid. However, the fibrous materials used for the absorbent structures are excellent in the performance of liquid-permeability of the aqueous liquid, but almost lack the performance of retaining the aqueous liquid. In view of this, the present inventors have found that it is possible to obtain an aqueous-liquid-absorbing agent that is excellent in the foregoing performances of the fibrous materials by containing the surface-crosslinked water-absorbent resin particles as essential components in the aqueous-liquid-absorbing agent.

Thus, the present inventors have subsequently made a series of various studies about performance design of the aqueous-liquid-absorbing agent on the assumption of comprising the above water-absorbent resin particles as essential components, wherein the water-absorbent resin particles are obtained by a process including the step of polymerizing a water-soluble ethylenically unsaturated monomer having a carboxyl group, have a crosslinked structure in their inside, and are surface-crosslinked. As a result, the present inventors have found that in order for the above aqueous-liquid-absorbing agent to have the performances of the fibrous materials used for the absorbent structures, the aqueous-liquid-absorbing agent comprising the above water-absorbent resin particles as essential components needs to exhibit a water absorption capacity (CRC) of 5 to 25 g/g, the water absorption capacity being an index of the performance of absorbing and retaining the aqueous liquid. In addition, the present inventors have further found that, in order for the above aqueous-liquid-absorbing agent to further diffuse the aqueous liquid rapidly in vertical and horizontal directions after having absorbed it, the above aqueous-liquid-absorbing agent favorably exhibit a saline flow conductivity (SFC) of not less than 1216 $cm^3 \cdot s \cdot 10^{-7}/g$, the saline flow conductivity being an index of the performance of liquid-permeability in a swollen gel under load. Then, the present inventors have completed the present invention by also conceiving, preparing, and carrying out a constitution and production process for materialization of the above and then confirming their functions and effects. Thus, it is possible to provide an aqueous-liquid-absorbing agent having the performances of the fibrous materials used for the absorbent structures, which is the object of the present invention, in such a manner that an aqueousliquid-absorbing agent that was conventionally desired to have a high water absorption capacity (CRC) of not less than 30 g/g or not less than 40 g/g, has a low water absorption capacity (CRC) of 5 to 25 g/g and a saline flow conductivity (SFC) of not less than 1216 cm$^3$·s·10$^{-7}$/g.

The present inventors have further found that, in order for the aqueous-liquid-absorbing agent to quickly absorb the aqueous liquid, the absorption rate (FSR) is favorably not less than 0.1 g/g/s, and on the other hand, that, in order for the above aqueous-liquid-absorbing agent to have the aqueous-liquid-retaining ability capable of further temporarily retaining the aqueous liquid after having quickly absorbed it, the above aqueous-liquid-absorbing agent favorably exhibit a wet porosity of not less than 20%, the wet porosity being an index of proportion of the volume of pore in a gel layer formed in an aqueous-liquid-absorbing agent swollen (wetted) under load, relative to the volume of the gel layer. Note that as the wet porosity is higher, the aqueous-liquid-absorbing agent is able to absorb the aqueous liquid at one go, retain the aqueous liquid temporarily quickly, and then diffuse the temporally retained aqueous liquid because of a large pore therebetween. Also, it can be said that the wet porosity is an index of the amount of liquid that can be retained between gels other than the aqueous liquid which is absorbed by the water absorbent resin and exists in the gel. Therefore, as the wet porosity is higher, the aqueous-liquid-absorbing agent can retain still more aqueous liquid therebetween, in addition to the liquid having been absorbed therein, after having absorbing the aqueous liquid.

(1) Aqueous-Liquid-Absorbing Agent According to the Present Invention

An aqueous-liquid-absorbing agent according to the present invention is an aqueous-liquid-absorbing agent containing water-absorbent resin particles as essential components, wherein the water-absorbent resin particles are obtained by a process including the step of polymerizing a water-soluble ethylenically unsaturated monomer having a carboxyl group, have a crosslinked structure in their inside, and are surface-crosslinked, the aqueous-liquid-absorbing agent exhibiting a water absorption capacity (CRC) of 5 to 25 g/g and a saline flow conductivity (SFC) of not less than 1216 cm$^3$·s·10$^{-7}$/g.

The aqueous-liquid-absorbing agent in the present invention refers to an agent for absorption and solidification of aqueous liquids, which agent comprises the water-absorbent resin particles as the main components and, if necessary, further comprises a small or very small amount of additive or water. The "water-absorbent resin particles as the main components" herein refer to 50 weight % or more water-absorbent resin particles content relative to the entire aqueous-liquid-absorbing agent. The water-absorbent resin particles content is favorably in the range of 60 to 100 weight %, more favorably 70 to 100 weight %, still more favorably 80 to 100 weight %, yet more favorably 90 to 100 weight %, relative to the entire aqueous-liquid-absorbing agent. As the small or very small amount of component, usually, water is contained as its main or essential component, and further such as the below-mentioned liquid-permeability-enhancing agent or additive is used.

Incidentally, the aqueous liquid is free of especial limitation if it contains water. Examples of the aqueous liquid include: water, urine; blood; excrement; waste liquids; moisture; steam; ice; mixtures of water and organic or inorganic solvents; rainwater; and underground water. However, favorably, the aqueous-liquid-absorbing agent of the present invention is used as an agent for absorption and solidification of urine, particularly, human urine.

In the present invention, the water-absorbent resin refers to a hydrogel-formable, water-swellable, and water-insoluble crosslinked polymer. Generally, the term "water-swellable" means absorbing a large quantity of water, e.g. ion exchanged water of essentially not less than 5 times, more favorably not less than 10 times, still more favorably not less than 20 times, especially favorably 50 to 1000 times self weight of the water-absorbent resin. Also, it can be said that the "water-swellable" crosslinked polymer is the one having "water absorption capacity in ion exchanged water" of not less than 5, more favorably not less than 10, still more favorably 20, especially favorably 50 to 1000. The "water absorption capacity in ion exchange water" is obtained in the same manner as the below-mentioned water absorption capacity (CRC) measurement method, except for measuring in ion exchanged water and using a water-absorbent resin or aqueous-liquid-absorbing agent of 0.020 g as an object to be measured.

The term "water-insoluble" means having an uncrosslinked extractable component content (water-soluble polymer) of favorably 0 to 50 weight %, more favorably not higher than 25 weight %, still more favorably not higher than 20 weight %, yet more favorably in the below-mentioned range, contained in the water-absorbent resin, relative to the total weight of the water-absorbent resin. These measurements are performed according to Examples of the present invention.

Specific examples of the hydrogel-formable, water-swellable, and water-insoluble crosslinked polymer or its particles include: partially-neutralized and crosslinked polymers of poly(acrylic acids) (e.g. U.S. Pat. Nos. 4,625,001, 4,654,039, 5,250,640, 5,275,773, EP 0456136); crosslinked and partially-neutralized graft polymers of starch-acrylic acid (U.S. Pat. No. 4,076,663); copolymers of isobutylene-maleic acid (U.S. Pat. No. 4,389,513); saponified copolymers of vinyl acetate-acrylic acid (U.S. Pat. No. 4,124,748); hydrolyzed (co)polymers of acrylamide (U.S. Pat. No. 3,959,569); and hydrolyzed polymers of acrylonitrile (U.S. Pat. No. 3,935,099).

The water-absorbent resin particles that can be used in the present invention are favorably of 100% particulate shape. Examples of the particulate shape includes: a spherical shape; a shape of an agglomerate of spheres; a shape like a flattened sphere; an irregularly pulverized shape; a shape of an agglomerate of irregularly pulverized materials; and a foamed shape having pores. Incidentally, in the present invention, the water-absorbent resin particles may be referred to simply as water-absorbent resin.

The following will describe (1-1) Aqueous-liquid-absorbing agent of the present invention, (1-2) Water-absorbent resin particles contained in the aqueous-liquid-absorbing agent of the present invention, and (1-3) Components other than the water-absorbent resin particles.

(1-1) Aqueous-Liquid-Absorbing Agent of the Present Invention

The aqueous-liquid-absorbing agent according to the present invention exhibits a water absorption capacity (CRC), index of the performance of absorbing and retaining the aqueous liquid, of 5 to 25 g/g, more favorably 9 to 20 g/g. Its upper limit value is 25 g/g, more favorably 22 g/g, more favorably 20 g/g, more favorably 18 g/g, still more favorably 16 g/g, especially favorably 14 g/g, most favorably 12 g/g. Its lower limit value is 5 g/g, more favorably 9 g/g, still more favorably 10 g/g.

Thus, it is possible to provide an aqueous-liquid-absorbing agent having the performances of the fibrous materials used for the absorbent structures, which is the object of the present invention, in such a manner that an aqueous-liquid-absorbing agent that was conventionally desired to have a high water absorption capacity (CRC) of not less than 30 g/g or not less than 40 g/g, has such a low water absorption capacity (CRC) of 5 to 25 g/g and a saline flow conductivity (SFC) of not less than 1216 cm$^3$·s·10$^{-7}$/g. In the case where the water absorption capacity (CRC) is less than 5 g/g, the aqueous-liquid-absorbing agent must be used in a large amount, for example, so that the diaper unfavorably becomes thick. In the case where the water absorption capacity (CRC) is more than 25 g/g, there is a possibility that the liquid permeability may be inferior.

The aqueous-liquid-absorbing agent according to the present invention exhibits a saline flow conductivity (SFC) of not less than 1216 cm$^3$·s·10$^{-7}$/g, more favorably not less than 1300 cm$^3$·s·10$^{-7}$/g, more favorably not less than 1400 cm$^3$·s·10$^{-7}$/g, still more favorably not less than 1450 cm$^3$·s·10$^{-7}$/g, especially favorably not less than 1500 cm$^3$·s·10$^{-7}$/g, most favorably not less than 1600 cm$^3$·s·10$^{-7}$/g. Its upper limit value is not particularly limited, but the upper limit value is favorably not more than 4000 cm$^3$·s·10$^{-7}$/g, more favorably not more than 3000 cm$^3$·s·$10^{-7}$/g.

The saline flow conductivity (SFC) is an index representing the performance of liquid permeability in a swollen gel under load. In the case where the SFC is within the above range, the aqueous-liquid-absorbing agent is able to further diffuse the aqueous liquid rapidly in vertical and horizontal directions after having absorbed it. In the case where the saline flow conductivity (SFC) is less than 1216 cm$^3$·s·10$^{-7}$/g, there is, for example, a possibility that the urine may unfavorably leak without being sufficiently diffused in absorbent structures.

The aqueous-liquid-absorbing agent according to the present invention combines the two physical properties, namely, the water absorption capacity (CRC) of 5 to 25 g/g and the saline flow conductivity (SFC) of not less than 1216 cm$^3$·s·10$^{-7}$/g, with good balance. Therefore, this agent can sufficiently exert the effects of the present invention. In the case where even one of these physical properties is unfavorably lacked, there is a possibility that the effects of the present invention cannot sufficiently be obtained.

The aqueous-liquid-absorbing agent according to the present invention favorably exhibits an absorption rate (FSR) of not less than 0.1 g/g/s, more favorably not less than 0.15 g/g/s, still more favorably not less than 0.2 g/g/s, especially favorably not less than 0.25 g/g/s, most favorably not less than 0.3 g/g/s. Its upper limit value is not particularly limited, but is favorably not more than 5 g/g/s, more favorably not more than 2 g/g/s, still more favorably not more than 1 g/g/s. This allows the aqueous-liquid-absorbing agent of the present invention to quickly absorb the aqueous liquid. For example, when the agent is used in diapers, the urine is instantaneously absorbed without its leakage. In the case where the absorption rate (FSR) is less than 0.1 g/g/s, there is, for example, a possibility that the urine may unfavorably leak without being sufficiently absorbed when the agent is used in diapers.

The aqueous-liquid-absorbing agent according to the present invention favorably exhibits a wet porosity of not less than 20%, more favorably not less than 30%, still more favorably not less than 35%, especially favorably not less than 40%. Its upper limit value is not particularly limited, but is favorably not more than 60%, more favorably not more than 50%.

The wet porosity is an index of proportion of the volume of pore between gel layers formed in an aqueous-liquid-absorbing agent swollen (wetted) under load, relative to the volume of the gel layer. In the case where the wet porosity is within the above range, the aqueous-liquid-absorbing agent is able to absorb the aqueous liquid at one go, retain the aqueous liquid temporarily quickly, and then diffuse the temporally retained aqueous liquid because of a large pore therebetween. In addition, the aqueous-liquid-absorbing agent is able to retain a large amount of liquid between the gels other than the aqueous liquid which is absorbed by the water absorbent resin and exists in the gel. Therefore, the aqueous-liquid-absorbing agent can retain still more aqueous liquid therebetween, in addition to the liquid having been absorbed therein, after having absorbing the aqueous liquid. In the case where the wet porosity is less than 20%, there is, for example, a possibility of resulting in an increased wet-back amount if a comparatively large amount of urine is excreted when the agent is used in diapers.

The aqueous-liquid-absorbing agent according to the present invention can combine the four physical properties, namely, the absorption rate (FSR) of not less than 0.1 g/g/s, the water absorption capacity (CRC) of 5 to 25 g/g, the saline flow conductivity (SFC) of not less than 1216 cm$^3$·s·10$^{-7}$/g, and the wet porosity of not less than 20%, with good balance. Therefore, this agent can more sufficiently exert the effects of the present invention.

The aqueous-liquid-absorbing agent according to the present invention exhibits an absorbency against pressure (AAP) in the range of favorably 5 to 25 g/g, more favorably 11 to 22 g/g. In the case where the absorbency against pressure (AAP) is less than 5 g/g, the aqueous-liquid-absorbing agent must be used in a large amount, for example, so that the diaper unfavorably becomes thick. In the case where the absorbency against pressure (AAP) is more than 25 g/g, there is a possibility that the liquid permeability may be inferior.

As to the aqueous-liquid-absorbing agent according to the present invention, the value (AAP/CRC) given by dividing the absorbency against pressure (AAP) by the water absorption capacity (CRC) is favorably in the range of 1.00 to 2.20, more favorably 1.10 to 2.00, still more favorably 1.15 to 1.90. In the case where the value (AAP/CRC) given by dividing the absorbency against pressure (AAP) by the water absorption capacity (CRC) is less than 1.00, the aqueous-liquid-absorbing agent must be used in a large amount, for example, so that the diaper unfavorably becomes thick. In the case where the value (AAP/CRC) given by dividing the absorbency against pressure (AAP) by the water absorption capacity (CRC) is more than 2.20, there are, for example, disadvantages of resulting in a large wet-back amount when the agent is used in diapers. As to conventional water-absorbent resin particles, the AAP/CRC is less than 1.00. However, the aqueous-liquid-absorbing agent according to the present invention is further characterized in that the AAP/CRC is in the above favorable range.

The aqueous-liquid-absorbing agent according to the present invention has an extractable component content in the range of favorably 0 to 15 weight %, more favorably 0 to 10 weight %, still more favorably 0 to 8 weight %. In the case where the extractable component content is higher than 15 weight %, there is, for example, a possibility that the agent may cause a skin eruption when used in such as diapers.

The shape of the aqueous-liquid-absorbing agent according to the present invention is free of especial limitation if it satisfies the aforementioned physical properties. This shape is favorably particulate shape, but may include a sheet shape and a fibrous shape, for example.

In the case where the aqueous-liquid-absorbing agent used in the present invention is particulate, the particle diameters and particle diameter distribution of this agent are free of especial limitation. However, for still more exerting the effects of the present invention, it is favorable that the weight-average particle diameter of this agent is in the range of 150 to 850 μm, more favorably 150 to 600 μm, more favorably 150 to 500 μm, more favorably 200 to 400 μm, still more favorably 250 to 380 μm, and also it is favorable that the logarithmic standard deviation (σζ) of this agent is favorably in the range of 0.1 to 0.45, more favorably 0.2 to 0.45, still more favorably 0.25 to 0.40, yet more favorably 0.30 to 0.35. A lower logarithmic standard deviation (σζ) of particle diameter distribution indicates a narrower particle diameter distribution. However, in the water-absorbent resin particles and aqueous-liquid-absorbing agent of the present invention, important is not a simply narrow particle diameter distribution, but a particle diameter distribution that is wide to some extent. In the case where the logarithmic standard deviation (σζ) is less than 0.1, not only the target performances cannot be obtained, but also productivity decreases seriously. In the case where the logarithmic standard deviation (σζ) exceeds 0.45, a particle diameter distribution becomes too wide, and there is a possibility that the target performances might not be obtained.

Examples of the water-absorbent resin particles and aqueous-liquid-absorbing agent of the present invention having a favorable combination of weight-average particle diameter (D50) and logarithmic standard deviation (σζ) of particle diameter distribution includes: those having a weight-average particle diameter (D50) of not less than 200 μm and less than 400 μm, and a logarithmic standard deviation (σζ) of particle diameter distribution of not less than 0.20 and not more than 0.45 (those having a small average particle diameter and narrow particle diameter distribution); and those having a weight-average particle diameter (D50) of not less than 400 μm and not more than 750 μm, and a logarithmic standard deviation (σζ) of particle diameter distribution of not less than 0.20 and not more than 0.45 (those having a large average particle diameter and narrow particle diameter distribution).

In the case where the aqueous-liquid-absorbing agent according to the present invention is a particulate aqueous-liquid-absorbing agent, then, for still more exerting the effects of the present invention, it is favorable that this agent includes particles having particle diameters in the range of 150 to 850 μm in an amount of not smaller than 90 to 100 weight %. Further, it is more favorable that this agent includes particles having particle diameters in the range of 150 to 600 μm in an amount of not smaller than 90 to 100 weight %, particularly favorably not smaller than 95 to 100 weight %. Further, it is more favorable that this agent includes particles having particle diameters in the range of 150 to 500 μm in an amount of not smaller than 90 to 100 weight %, particularly favorably not smaller than 95 to 100 weight %. In the case where particles of smaller than 150 μm in particle diameter are included in a large amount, there is a possibility that the liquid permeability may be so poor as to result in failure to sufficiently exert the effects of the present invention. In the case where particles of larger than 850 μm in particle diameter are included in a large amount, there is a possibility that, on the occasion of the practical use, for example, an unpleasant feeling may be given to human bodies during the contact therewith.

The aqueous-liquid-absorbing agent according to the present invention combines the two physical properties, namely, the water absorption capacity (CRC) and the saline flow conductivity (SFC) with good balance. Therefore, this agent is used favorably for uses in such as: sanitary materials (e.g. diapers); aqueous-liquid-absorbing agents for potable toilets; solidifying agents for waste liquids; and water-retaining agents for agriculture; and is favorable particularly for the sanitary materials (e.g. diapers).

(1-2) Water-Absorbent Resin Particles Contained in the Aqueous-Liquid-Absorbing Agent of the Present Invention In the present invention, favorably used as water-absorbent resin particles are water-absorbent resin particles obtained by a process including the step of polymerizing a water-soluble ethylenically unsaturated monomer having a carboxyl group, and having a crosslinked structure.

Examples of water-absorbent resin particles obtained by a process including the step of polymerizing a water-soluble ethylenically unsaturated monomer having a carboxyl group include: polymers obtained by polymerizing and crosslinking carboxyl-group containing unsaturated monomers having a carboxyl group such as (meth)acrylic acid, maleic anhydride, maleic acid, fumaric acid, crotonic acid, itaconic acid, and cinnamic acid, and/or their salts (neutralizer); hydrolyzed graft polymers of starch-acrylonitrile; graft polymers of starch-acrylic acid; saponified copolymers of vinyl acetate-acrylate acid; hydrolyzed or crosslinked acrylonitrile copolymers or acrylamide copolymers; denatured carboxyl-group containing crosslinked polyvinyl alcohol; crosslinked copolymers of isobutylene-maleic anhydride; or either one or a combination of two or more substances among the above substances. Above all, the water-absorbent resin particles are water-absorbent resin particles including a crosslinked polyacrylic acid (salt) polymer obtained by a process including the step of polymerizing a monomer including acrylic acid and/or its salt as a main component.

The crosslinked polyacrylic acid (salt) polymer in the present invention is a polymer which is obtained by a process including the step of polymerizing a monomer (excluding cross-linking agent) containing acrylic acid and/or its salt in an amount of favorably 50 to 100 mol %, more favorably 70 to 100 mol %, still more favorably 90 to 100 mol %, and has a crosslinked structure in its inside.

In addition, 45 to 85 mol % of the carboxyl group in the water-absorbent resin particles are favorably neutralized to form salt. In other words, the carboxyl group of the water-absorbent resin particles favorably has a neutralization degree of 45 to 85 mol %, more favorably 50 to 85 mol %, still more favorably 55 to 80 mol %, especially favorably 60 to 75 mol %. As examples of the salt, there can be cited at least one of such as: alkaline metal (e.g. sodium, potassium, lithium) salts, ammonium salts, and amine salts. The neutralization of the carboxyl group for forming the salt may be carried out in a monomer state before the polymerization, or may be carried out in a polymer state on the way of or after the polymerization, or may be carried out both in these states.

Incidentally, a neutralization degree of a carboxyl group in the water-absorbent resin particles can be obtained by calculation from (i) the amount of water-soluble ethylenically unsaturated monomer having a not-yet-neutralized carboxyl group and (ii) the total amount of bases as used for neutralization before the polymerization, during the polymerization, and/or after the polymerization. Alternatively, as mentioned below, the neutralization degree may be obtained by titration of an extractable component content in the water-absorbent resin particles.

The water-absorbent resin particles favorably used in the present invention may, if necessary, realized by a copolymer obtained by copolymerizing another monomer jointly with the water-soluble ethylenically unsaturated monomer having a carboxyl group (if crosslinked polyacrylic acid (salt) polymer, acrylic acid and/or its salt) used as the main component.

Specific examples of the above other monomer include: anionic unsaturated monomers (e.g. methacrylic acid, maleic acid, vinylsulfonic acid, styrenesulfonic acid, 2-(meth)acrylamido-2-methylpropanesulfonic acid, 2-(meth)acryloylethanesulfonic acid, 2-(meth)acryloylpropanesulfonic acid) and their salts; nonionic-hydrophilic-group-containing unsaturated monomers (e.g. acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, N-vinylacetamide); and cationic unsaturated monomers (e.g. N,N-dimethylaminoethyl (meth)acrylate, N,N-diethylaminoethyl(meth)acrylate, N,N-dimethylaminopropyl (meth)acrylate, N,N-dimethylaminopropyl(meth) acrylamide, and their quaternary salts). The amount of these monomers used as monomers other than acrylic acid and/or its salt is favorably in the range of 0 to 30 mol %, more favorably 0 to 10 mol %, of the entire monomers.

The water-absorbent resin particles, usable in the present invention, have a crosslinked structure in their inside and surface. As to methods for introducing the internal crosslinked structure into the water-absorbent resin particles as used in the present invention, examples thereof include: a method in which the introduction is carried out by self-crosslinking without any crosslinking agent; and a method in which the introduction is carried out by copolymerization or reaction with an internal-crosslinking agent having at least two polymerizable ethylenical double bonds and/or at least two functional groups per molecule. The functional groups are highly reactive groups in a molecule and includes a covalent-bondable functional group and an ion-bondable functional group. For still more exerting the effects of the present invention, it is favorable that the water-absorbent resin particles usable in the present invention are surface-crosslinked ones.

(1-3) Components Other than the Water-Absorbent Resin Particles

The aqueous-liquid-absorbing agent according to the present invention contains the water-absorbent resin particles as main components and contains a small amount of additive and/or water, if necessary. The aqueous-liquid-absorbing agent of the present invention favorably contains a liquid-permeability-enhancing agent as the additive. Especially, in the case where the aqueous-liquid-absorbing agent includes water-absorbent resin particles not subjected to treatment for liquid permeability enhancement as main components, it is very favorable that it further includes a liquid-permeability-enhancing agent. On the other hand, in the case where the aqueous-liquid-absorbing agent includes water-absorbent resin particles subjected to treatment for liquid permeability enhancement, the aqueous-liquid-absorbing agent according to the present invention may be realized by only the water-absorbent resin particles. The liquid-permeability-enhancing agent herein refers to an agent which enhances an SFC of water-absorbent resin particles or aqueous-liquid-absorbing agent having an SFC of not less than 1 by at least 10.

Mixture of the liquid-permeability-enhancing agent with the water-absorbent resin particles or aqueous-liquid-absorbing agent, holds a path for the water-absorbent resin particles or aqueous-liquid-absorbing agent after having absorbed the aqueous liquid in a physical manner or ionized manner, and thus makes it possible to increase liquid permeability.

Examples of the liquid-permeability-enhancing agent include: water-soluble multivalent metal compounds (e.g. aluminum sulfate, potassium alum, ammonium alum, sodium alum, (poly)aluminum chloride, and their hydrates); water-soluble polycationic compounds (e.g. polyethylenimine, polyvinylamine, polyallylamine); and water-insoluble inorganic fine particles (e.g. silica, alumina, bentonite). These may be used either alone respectively or in combinations with each other. Above all, water-soluble multivalent metal salts (e.g. aluminum sulfate, potassium alum) are favorable in point of enhancing the saline flow conductivity (SFC) more than that in a case of adding no water-soluble multivalent metal salts.

The liquid-permeability-enhancing agent is used in an amount of favorably 0.001 to 10 weight %, more favorably 0.01 to 5 weight %, relative to the water-absorbent resin particles.

Note that, the liquid-permeability-enhancing agent is not limited if it enhances liquid permeability, but preferably a substance which forms no covalent bonds with functional groups on the surface of the water-absorbent resin particles.

Further, the aqueous-liquid-absorbing agent according to the present invention may further include, if necessary, another additive in such a range that absorption properties such as liquid-permeability of the aqueous-liquid-absorbing agent do not decrease. Examples of the another additive include: deodorizer, antimicrobial agent, fragrant material, blowing agent, pigment, dye, plasticizer, adhesive, surfactant, oxidizer, reducer, water, salts, chelating agent, bactericidal agent, hydrophilic polymer such as polyethyleneglycol, paraffin, hydrophobic polymer, thermoplastic resin such as polyethylene and polypropylene, and thermosetting resin such as polyester resin and urea resin. For example, the aqueous-liquid-absorbing agent according to the present invention may further include the another additive of the order of 0 to 10 weight %, relative to the water-absorbent resin particles.

(2) Process for Production of the Aqueous-Liquid-Absorbing Agent According to the Present Invention The process for production of an aqueous-liquid-absorbing agent according to the present invention is not particularly limited if it is a process for production of aqueous-liquid-absorbing agent which exhibits a water absorption capacity (CRC) of 5 to 25 g/g and a saline flow conductivity (SFC) of not less than 1216 $cm^3 \cdot s \cdot 10^{-7}/g$.

The process for production of an aqueous-liquid-absorbing agent according to the present invention includes, for example, at least the following steps:

(2-1) polymerizing a water-soluble ethylenically unsaturated monomer having a carboxyl group in an aqueous monomer solution including the water-soluble ethylenically unsaturated monomer having a carboxyl group, in the presence of an internal-crosslinking agent having at least four functional groups each capable of forming a covalent bond with a carboxyl group to thereby obtain a hydropolymer;

(2-3) drying the hydropolymer obtained in the step (2-1) at a temperature of not less than 150° C. to thereby obtain water-absorbent resin particles; and (2-5) surface-crosslinking the water-absorbent resin particles obtained in the step (2-3).

In addition, the process for production of an aqueous-liquid-absorbing agent according to the present invention may further include at least one of the following steps:

(2-2) before the step (2-1), further preparing an aqueous monomer solution including a water-soluble ethylenically unsaturated monomer having a carboxyl group and an internal-crosslinking agent having at least four functional groups each capable of forming a covalent bond with the carboxyl group;

(2-4) pulverizing the obtained hydropolymer or the obtained water-absorbent resin particles at least before or after the step (2-3);

(2-6) subjecting the water-absorbent resin particles to treatment for liquid permeability enhancement before or after the step (2-5).

The following will describe the above steps.

(2-1) Polymerizing Step

In this step, a water-soluble ethylenically unsaturated monomer having a carboxyl group in an aqueous monomer solution including the water-soluble ethylenically unsaturated monomer having a carboxyl group, is polymerized in the presence of at least one internal-crosslinking agent to obtain a hydropolymer. As the internal-crosslinking agent, used is an internal-crosslinking agent having at least four functional groups each capable of forming a covalent bond with the carboxyl group of the water-soluble ethylenically unsaturated monomer. The water-soluble ethylenically unsaturated monomer having a carboxyl group is as described in Section (1-1).

In this step, if necessary, another monomer, as described in Section (1-1), may be copolymerized jointly with the water-soluble ethylenically unsaturated monomer having a carboxyl group. In the case where the another monomer is copolymerized, the aqueous monomer solution includes the another monomer as well as the water-soluble ethylenically unsaturated monomer having a carboxyl group. Hereinafter, the monomer included in the aqueous monomer solution, i.e. (a) if no another monomer is used, the water-soluble ethylenically unsaturated monomer having a carboxyl group or (b) if another monomer is used, the water-soluble ethylenically unsaturated monomer having a carboxyl group and another monomer as used, is simply referred to as monomer.

Also, in this step, polymerization reaction is carried out in the presence of at least one inner-crosslinking agent. As the inner-crosslinking agent, at least an inner-crosslinking agent having at least four functional groups each of which forms a covalent bond with the carboxyl group of the water-soluble ethylenically unsaturated monomer is favorably used. This increases a saline flow conductivity (SFC) of the obtained water-absorbent resin particles, as compared with those obtained with a single use of (a) an internal-crosslinking agent having three or less functional groups each capable of forming a covalent bond with the carboxyl group of the water-soluble ethylenically unsaturated monomer or those obtained with the use of (b) an internal-crosslinking agent having at least two polymerizable ethylenical double bonds jointly with the internal-crosslinking agent (a).

The functional groups each capable of forming a covalent bond with a carboxyl group of the water-soluble ethylenically unsaturated monomer having the carboxyl group, are not particularly limited if they are functional groups which form bonds with the carboxyl group. Examples of the functional groups include: hydroxyl group, amino group, epoxy group, oxetane group, ethyleneimine group (aziridine group), isocyanate group, oxazoline, cyclocarbonate, cyclocarbonate, oxazolidinone, cyclic urea, azithidinium salt and chlorohydrin.

Therefore, examples of the internal-crosslinking agent having at least four functional groups each capable of forming a covalent bond with a carboxyl group include: an internal-crosslinking agent having at least four hydroxyl groups; an internal-crosslinking agent having at least four amino groups; an internal-crosslinking agent having at least four epoxy groups; an internal-crosslinking agent having at least four oxetane groups; an internal-crosslinking agent having at least four ethyleneimine groups (aziridine groups); an internal-crosslinking agent having at least four isocyanate groups; an internal-crosslinking agent having at least four oxazolines; an internal-crosslinking agent having at least four cyclocarbonates; an internal-crosslinking agent having at least four oxazolidinones; an internal-crosslinking agent having at least four cyclic ureas; an internal-crosslinking agent having at least four azithidinium salts; an internal-crosslinking agent having at least four chlorohydrins; and an internal-crosslinking agent having at least two kinds of functional groups selected from among hydroxyl group, amino group, epoxy group, oxetane group, ethyleneimine group (aziridine group), isocyanate group, oxazoline, cyclocarbonate, oxazolidinone, cyclic urea, azithidinium salt and chlorohydrin, wherein a combined total number of groups in the selected functional groups is at least four. Above all, the internal-crosslinking agent having at least four functional groups each capable of forming a covalent bond with a carboxyl group is more favorably the internal-crosslinking agent having at least four hydroxyl groups. Incidentally, in the case where the internal-crosslinking agent has a plurality kinds of groups, a ratio between the groups is not particularly limited.

In addition, the internal-crosslinking agent having at least four functional groups each capable of forming a covalent bond with a carboxyl group may further have at least one polymerizable ethylenical double bond, ion-bondable functional group, or the like.

Moreover, the internal-crosslinking agent having at least four functional groups each capable of forming a covalent bond with a carboxyl group is not particularly limited if it has at least four functional groups each capable of forming a covalent bond with a carboxyl group. However, the number of the functional groups each capable of forming a covalent bond with a carboxyl group is favorably 4 to 50, more favorably 4 to 20, still more favorably 4 to 10, especially favorably 4 to 6. The number of carbon atoms of the internal-crosslinking agent is favorably 0.5 to 4 times as many as the number of the functional groups each capable of forming a covalent bond with a carboxyl group, more favorably 1 to 2 times. In the case where the number of such a functional groups is less than 4 or exceeds 50, the liquid permeability poorly enhances.

Specifically, examples of the internal-crosslinking agent having at least four hydroxyl groups include: polyhydric alcohol such as polyglycerol or pentaerythritol; sugar alcohol such as erythritol, xylitol, sorbitol, mannitol, maltitol, lactitol, or oligosaccharide alcohol; aldose such as xylose, glucose, gulose, mannose, or idose; and ketose such as fructose or sorbose. Examples of the internal-crosslinking agent having at least four amino groups include triethylenetetramine, tetraethylenepentamine, and pentaethylenehexamine. Examples of the internal-crosslinking agent having hydroxyl group and amino group include 2-amino-2-hydroxymethyl-1,3-propanediol, and N,N-bis-(2-hydroxyethyl)ethylenediamine. These internal-crosslinking agents having at least four functional groups each capable of forming a covalent bond with a carboxyl group may be used either alone respectively or in combinations with each other.

Above all, the internal-crosslinking agent having at least four functional groups each capable of forming a covalent bond with a carboxyl group is more favorably the internal-crosslinking agent having at least four hydroxyl groups; more favorably sugar alcohol; still more favorably erythritol, xylitol, or sorbitol; especially favorably xylitol or sorbitol; most favorably sorbitol. These substances are favorably in view of their extremely high safety.

Further, the internal-crosslinking agent having at least four functional groups each capable of forming a covalent bond with a carboxyl group may be either high-molecular weight compound or low-molecular weight compound, but more favorably low-molecular weight compound. Its molecular weight is not particularly limited, but more favorably not more than 5000, more favorably not more than 2000, still more favorably not more than 1000, especially favorably not more than 500, most favorably not more than 200. Still further, a lower limit of the molecular weight of the internal-crosslinking agent having at least four functional groups each capable of forming a covalent bond with a carboxyl group is not particularly limited, but favorably 50, more favorably 80, still more favorably 90. The molecular weight of the above internal-crosslinking agent in the above range is favorably because internal crosslinking is carried out more efficiently. Further, in the case where polyvinyl alcohol, starch, or the like is used as an internal-crosslinking agent, there may occur coloring during drying. Therefore, the molecular weight is favorably in the above range.

Besides, the internal-crosslinking agent having at least four functional groups each capable of forming a covalent bond with a carboxyl group is favorably water-soluble such that it dissolves in amount of not less than 0.1 g in pure water of 100 g from the view points that it can be added easily and realize uniform crosslinking.

Incidentally, the foregoing internal-crosslinking agent having at least four functional groups may be of partially modified functional groups if there remains at least four free functional groups each capable of forming a covalent bond with a carboxyl group. The internal-crosslinking agent having unmodified functional groups is favorably used in terms of hydrophilicity, properties, safety and coloring after the heating treatment.

Incidentally, as to the foregoing internal-crosslinking agent having at least four functional groups, all the functional groups do not necessarily form a covalent bond with the carboxyl group of the water-absorbent resin as long as at least one of the functional groups forms covalent bond with the carboxyl group of the water-absorbent resin in the water-absorbent resin particles. Part of the functional groups may be free without forming covalent bond with the carboxyl group of the water-absorbent resin. Further, part of the internal-crosslinking agent having at least four functional groups as used may exist without reacting (i.e. none of the functional groups forms bonds).

Suppose that an internal-crosslinking agent having at least four functional groups each capable of forming a covalent bond with a carboxyl group is an internal-crosslinking agent A, and that the internal-crosslinking agent A in which none of the functional groups form a covalent bond with a carboxyl group of the water-absorbent resin particles is an unreacted internal-crosslinking agent A. Note that it is unclear whether or not the unreacted internal-crosslinking agent A is involved in the crosslinking. The unreacted internal-crosslinking agent A can be extracted from the water-absorbent resin particles so as to be quantified by analysis in the Liquid Chromatography (LC) or the other method. An extraction method is not particularly limited and may be selected appropriately from among the conventionally known extraction methods. For example, 1 g of the water-absorbent resin particles are stirred in 0.9 weight % of aqueous sodium chloride solution for two or more hours, and thereafter the resultant aqueous sodium chloride solution is filtered so that an extract obtained as a filtrate is analyzed in the Liquid Chromatography.

Suppose that the internal-crosslinking agent A in which at least one of the four functional groups forms bond with a carboxyl group is a reacted internal-crosslinking agent A. The reacted internal-crosslinking agent A can be quantified in the following manner: the water-absorbent resin particles are hydrolyzed, and the resultant liquid is analyzed in the Gas Chromatography-Mass Spectrometry (GC-MS) or the other method.

As the internal-crosslinking agent, an internal-crosslinking agent having at least four of the foregoing functional groups is used. Additionally, another internal-crosslinking agents may be used. Examples of the another internal-crosslinking agents, as described previously, includes: an internal-crosslinking agent having at least two polymerizable ethylenical double bonds and/or at least two functional groups per molecule.

Specific examples of these another internal-crosslinking agents include: copolymerizable crosslinking agents having at least two polymerizable ethylenical double bonds, such as N,N'-methylenebis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, tetraallyloxyethane, pentaerythritol triallyl ether, and poly(meth)allyloxyalkanes. In addition, as examples of internal-crosslinking agents having a copolymerizable group having at least two polymerizable ethylenical double bonds and a covalent-bondable group, there can be cited such as (poly)ethylene glycol diglycidyl ether, glycerol diglycidyl ether, ethylenediamine, polyethylenimine, glycidyl(meth)acrylate, hydroxyethyl(meth)acrylate, hydroxypropyl(meth)acrylate, and glycidyl(meth)acrylate.

In addition, besides, as examples of internal-crosslinking agents having at least two covalent-bondable or ionic-bondable functional groups, there can also be cited such as: ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers; and multivalent metallic compounds (e.g. hydroxides and chlorides of such as zinc, calcium, magnesium, aluminum, iron and zirconium).

These internal-crosslinking agents may be used either alone respectively or in combinations with each other. Above all, from the viewpoint of such as water absorption properties of the obtained water-absorbent resin particles, it is favorable that a compound having at least two polymerizable ethylenically double bonds is used as the another internal-crosslinking agent. Further, the internal-crosslinking agent having polymerizable ethylenical double bond and a covalent-bondable functional group and the internal-crosslinking agent having at least two covalent-bondable and/or ionic-bondable functional groups, may be used jointly therewith.

For sufficiently exerting the effects of the present invention, the water-absorbent resin particles usable in the present invention, as described previously, are favorably a polymer subjected to internal crosslinking with an internal-crosslinking agent having at least four functional groups each of which forms a covalent bond with a carboxyl group of the water-soluble ethylenically unsaturated monomer having the carboxyl group. As to the amount of usage of this internal-crosslinking agent having at least four functional groups each of which forms a covalent bond with a carboxyl group, the amount of usage (Y) (unit: mol %) of the internal-crosslinking agent having at least four functional groups each capable of forming a covalent bond with a carboxyl group, relative to the water-soluble ethylenically unsaturated monomer, is favorably in the range expressed by the following equation (1):

$$Y \geq 0.06/\{2-(2.35X/100)\} \qquad (1).$$

In the equation (1) and the below-mentioned equation (2), X is a neutralization degree (unit: mol %) of a carboxyl group in the water-absorbent resin particles, and favorably in the range of 0.45 to 0.85. If Y falls outside the range expressed by the equation (1), internal crosslinking is carried out insufficiently, and thus a saline flow conductivity (SFC) of the obtained water-absorbent resin particles increases poorly. In addition, the water absorption capacity (CRC) exceeds 25 g/g, and there is a possibility that an aqueous-liquid-absorbing agent having target performances of the present invention cannot be obtained.

The lower limit of the Y is, when it is $Y=Z/\{2-(2.35X/100)\}$ ... (2), is a value such that it is favorably Z=0.06, more favorably Z=0.07, still more favorably Z=0.09, especially favorably Z=0.15.

The upper limit of the Y is a value such that it is favorably Z=1.2, more favorably Z=0.6, still more favorably Z=0.3 in the above equation (2). It is unfavorable that the Y is larger than $1.2/\{2-(2.35X/100)\}$, because a water absorption capacity becomes too low.

In the case where the another internal-crosslinking agent is used, the total amount of the another internal-crosslinking agent as used is favorably in the range of 0 to 2 mol %, more favorably 0 to 1.5 mol %, still more favorably 0 to 1 mol %, particularly favorably 0 to 0.5 mol %, relative to the entire monomers (water-soluble ethylenically unsaturated monomers excluding the internal-crosslinking agents).

Incidentally, the above non-high-molecular weight compound and another internal-crosslinking agent may be added before polymerization of a monomer or added on the way of the polymerization, so as to exist at the time of the polymerization. Further, the internal-crosslinking agent may be added to a reaction system at one time or several times. In the case where at least one or two internal-crosslinking agents are used, an internal-crosslinking agent having at least two polymerizable ethylenical double bonds is favorably used at the time of polymerization in view of finally obtained absorption properties of the water-absorbent resin particles or the aqueous-liquid-absorbing agent. In the case where only a covalent-bondable internal-crosslinking agent is used as the internal-crosslinking agent, internal crosslinking is carried out in heating in the below-mentioned drying step and surface-crosslinking step. On the other hand, in the case where an internal-crosslinking agent having at least two polymerizable ethylenical double bonds is used as the internal-crosslinking agent, internal crosslinking is carried out during the polymerizing step.

When the polymerization is carried out, there can be added hydrophilic polymers (e.g. starch, cellulose, starch derivatives, cellulose derivatives, polyvinyl alcohol, polyacrylic acid (salts), and crosslinked polyacrylic acid (salts)) in an amount of 0 to 30 weight % relative to the entire monomers (water-soluble monomers excluding the internal-crosslinking agents); and chain transfer agents (e.g. hypophosphorous acid (salts)) in an amount of 0 to 1 weight % relative to the entire monomers (water-soluble monomers excluding the internal-crosslinking agents).

When the above monomer including the water-soluble ethylenically unsaturated monomer (favorably, acrylic acid and/or its salt) as the major component is polymerized to obtain the water-absorbent resin particles usable in the present invention, then bulk polymerization, reversed-phase suspension polymerization, or precipitation polymerization may be carried out, but, from the viewpoint of the performance or the easiness in controlling the polymerization, it is favorable to carry out aqueous solution polymerization in which the monomer is used in the form of an aqueous solution. Such polymerization methods are disclosed in such as U.S. Pat. Nos. 4,625,001, 4,769,427, 4,873,299, 4,093,776, 4,367,323, 4,446,261, 4,683,274, 4,690,996, 4,721,647, 4,738,867, 4,748,076, and EP 1178059.

When the polymerization is carried out, there may, for example, be used the following: radical polymerization initiators such as potassium persulfate, ammonium persulfate, sodium persulfate, t-butyl hydroperoxide, hydrogen peroxide, and 2,2'-azobis(2-amidinopropane) dihydrochloride; and active energy rays such as ultraviolet rays and electron beams. In addition, in the case where the radical polymerization initiators are used, they may be used jointly with reducing agents such as sodium sulfite, sodium hydrogensulfite, ferrous sulfate, and L-ascorbic acid to carry out redox polymerization. The amount of these polymerization initiators as used is favorably in the range of 0.001 to 2 mol %, more favorably 0.01 to 0.5 mol %, relative to the entire monomers.

When the polymerization is carried out, the monomer may be used in a slurry state exceeding a saturated concentration. However, the aqueous monomer solution as used has a monomer concentration of favorably neither lower than 35 weight % nor higher than the saturated concentration, more favorably neither lower than 37 weight % nor higher than the saturated concentration. Incidentally, the monomer concentration is a concentration of the entire monomers in the aqueous monomer solution, namely (a) when no other monomers are used, a concentration of a water-soluble ethylenically unsaturated monomer having a carboxyl group or (b) when other monomers are used, a total concentration of a water-soluble ethylenically unsaturated monomer having a carboxyl group and the other monomers as used. The temperature of the aqueous monomer solution is favorably in the range of 0 to 100° C., more favorably 10 to 95° C. Incidentally, the saturated concentration is specified by the temperature of the aqueous monomer solution at normal pressures.

The water-absorbent resin, obtained by the above polymerization, is a hydropolymer, and its shape is generally such as irregularly pulverized shape, spherical shape, fibrous shape, bar shape, approximately spherical shape, or flat shape.

(2-2) Aqueous Monomer Solution Preparing Step

A process for production of an aqueous-liquid-absorbing agent according to the present invention may further include an aqueous monomer solution preparing step of preparing an aqueous monomer solution including a water-soluble ethylenically unsaturated monomer having a carboxyl group and at least one of the foregoing internal-crosslinking agents, before the polymerization step.

The aqueous monomer solution includes at least (i) a water-soluble ethylenically unsaturated monomer having a carboxyl group and (ii) an internal-crosslinking agent having at least four functional groups each capable of forming a covalent bond with the carboxyl group of the water-soluble ethylenically unsaturated monomer. Additionally, the aqueous monomer solution may include another monomer and another internal-crosslinking agent.

(2-3) Drying Step

A polymer obtained in the aforementioned polymerization step is obtained as a hydropolymer. The obtained hydropolymer is, if necessary, pulverized in the form of a hydropolymer with water content of not less than 10% but less than 70%, for example. Further, the pulverized hydropolymer particles are dried. Conditions for drying the hydropolymer and pulverized hydropolymer particles are not particularly limited. However, the drying is carried out normally in the temperature range of 150 to 250° C., favorably 150 to 220° C., more favorably 160 to 200° C., still more favorably 180 to 200° C. Drying at temperatures lower than 150° C. makes less prone to bringing an internal-crosslinking reaction. Drying at temperatures higher than 250° C. might cause the resultant water-absorbent resin to be colored. Incidentally, in the case where oil or steam is used as a heat medium, the drying temperature is a temperature of the heat medium. On the other hand, in the case where electron irradiation or other means is used for drying without using the heat medium, the drying temperature is a temperature of the material (object to be dried). Alternatively, the drying temperature may be changed stepwise. The duration of the drying may be determined to obtain a target water content, depending upon surface area and water content of the hydropolymer and the type of a drying oven. For example, the duration of the drying is in the range of 10 to 180 minutes, more favorably 30 to 120 minutes. In addition, it is also possible to apply a drying method as described in U.S. Pat. No. 4,920,202.

As a result of the drying, the hydropolymer or the pulverized hydropolymer particles obtained in such a manner that the hydropolymer is pulverized, if necessary, in the below-mentioned pulverizing step, favorably have a solid content in the range of 70 to 99.8 weight %, more favorably 80 to 99.7 weight %, still more favorably 90 to 99.5 weight %. In the case where the solid content deviates from these ranges, it is difficult to achieve the enhancement of the physical properties of the water-absorbent resin by its surface treatment (crosslinking). Incidentally, the solid content refers to the ratio of the weight, as left by subtracting the drying loss on drying at 180° C. in 3 hours, to the weight before the drying.

As a drying method as used, various kinds of methods can be adopted so as to obtain a target water content, such as heat drying, hot-air drying, reduced-pressure drying, infrared drying, microwave drying, dehydration by azeotropy with a hydrophobic organic solvent, high-temperature drying by means of high-temperature steam. However, these methods are not the only possibility.

(2-4) Pulverizing Step

A process for production of an aqueous-liquid-absorbing agent according to the present invention favorably includes the pulverizing step of pulverizing the obtained hydropolymer or water-absorbent resin particles before or after the drying step, favorably before and after the drying step.

The resultant hydropolymer obtained in the polymerization step may be dried as it is. However, favorably, the resultant hydropolymer is pulverized before the drying step. For example, the resultant hydropolymer is extruded from a perforated structure having perforation diameters in the range of 0.3 to 18 mm to thus pulverize the hydropolymer to thereby form it into pulverized hydropolymer particles. By such extrusion of the hydropolymer from the perforated structure having the specific perforation diameters to thus pulverize the hydropolymer, it becomes possible to form it into the pulverized hydropolymer particles which can sufficiently exert the effects of the present invention. The shape of the perforations is such as a circular, quadrangular (e.g. square, rectangular), triangular, or hexagonal shape and is not especially limited. However, favorably, the hydropolymer is extruded from circular perforations. Incidentally, the aforementioned perforation diameters are defined as the diameters given in the case of converting the outer peripheries of the mesh opening portions into those of the circles.

The perforation diameters of the perforated structure for carrying out the extrusion pulverization in order to obtain the pulverized hydropolymer particles are more favorably in the range of 0.5 to 16 mm, still more favorably 0.5 to 12 mm, especially favorably 0.5 to 9.5 mm, most favorably 0.5 to 6.4 mm.

In the case where the perforation diameters of the perforated structure are smaller than 0.3 mm, there is a possibility that the gel may become strings, or that the gel cannot be extruded. In the case where the perforation diameters of the perforated structure are larger than 18 mm, there is a possibility that the effects of the present invention cannot be exerted. Especially, there is a possibility that absorption rate (FSR) decreases.

Examples of the apparatus for carrying out the extrusion pulverization in order to obtain the pulverized hydropolymer particles include such as extrudes the hydropolymer from a perforated plate to thereby pulverize the hydropolymer. As the extrusion mechanism, there is used the mechanism of the type which can press-feed the hydropolymer from its supply inlet to the perforated plate, such as screw type or rotary roll type. The screw type extruder may be a single or multiple screw type and may be a type which is used usually for extrusion molding of edible meat, rubber, and plastic or used as a pulverizer. Examples thereof include meat choppers and Dome Gran.

It is favorable that at least a portion of the water-absorbent resin particles usable in the present invention are agglomerate particles. More favorably, these agglomerate particles are those which are obtained by a process including the step of agglomeration of particles having particle diameters of smaller than 150 µm. The process for achieving such a mode that at least a portion of the water-absorbent resin particles are agglomerate particles is not especially limited and will do if hitherto publicly known agglomeration processes are applied thereto. Examples of such applicable processes include processes in which: warm water and a fine powder of water-absorbent resin particles are mixed together and then dried (U.S. Pat. No. 6,228,930); a fine powder of water-absorbent resin particles is mixed with an aqueous monomer solution, and then the resultant mixture is polymerized (U.S. Pat. No. 5,264,495); water is added to a fine powder of water-absorbent resin particles, and then the resultant mixture is agglomerated under not less than a specific face pressure (EP 0844270); a fine powder of water-absorbent resin particles is sufficiently wetted to thus form an amorphous gel, and then this gel is dried and pulverized (U.S. Pat. No. 4,950,692); and a fine powder of water-absorbent resin particles and a polymer gel are mixed together (U.S. Pat. No. 5,478,879).

In addition, it is favorable that at least a portion of the water-absorbent resin particles usable in the present invention are foamed particles. These foamed particles are favorably those which are obtained by a process characterized by including the step of polymerizing the monomer containing an azo initiator or a foaming agent (e.g. a carbonate) or polymerizing the monomer while it contains bubbles by causing it to bubble with an inert gas.

As a particularly favorable mode, the present inventors have found out that the agglomeration can be carried out at the same time as the gel pulverization if, as is aforementioned, the hydropolymer (obtained by polymerizing the aqueous monomer solution which has the specific monomer concentration and contains the specific internal-crosslinking agent in the specific amount) is extruded under the specific conditions (namely, extruded from the perforated structure having perforation diameters in the range of 0.3 to 18 mm) to thus pulverize the hydropolymer. In this process, in order to carry out the agglomeration at the same time as the pulverization, it is permitted to add such as: water; the polyhydric alcohols aforementioned as examples of the internal-crosslinking agent; mixed liquid of water and the polyhydric alcohols; solutions prepared by dissolving, into water, the multivalent metals aforementioned as examples of the internal-crosslinking agent; or their vapors. In other words, it is favorable that at least a portion of the pulverized hydropolymer particles, obtained by extruding the hydropolymer to thus pulverize the hydropolymer, are agglomerates. Incidentally, the agglomerates refer to those which are in the form resultant from adhesion of finely pulverized gel particles to each other, that is, cohesion of those particles, or resultant from adhesion of smaller particles to one particle. The form of the agglomerates can be confirmed from a state where more than one particle are bonded together when they are examined under an optical microscope or electron microscope. Besides, in the case where the aqueous-liquid-absorbing agent is particulate, the form of the agglomerates can be confirmed also from the decrease of the bulk density due to the agglomeration.

In the present invention, the water-absorbent resin particles or the aqueous-liquid-absorbing agent favorably has a bulk density in the range of 0.40 to 0.80 g/ml, more favorably 0.45 to 0.75 g/ml, still more favorably 0.50 to 0.70 g/ml, and contains the agglomerate particles in such a range. In the case where the bulk density deviates from the above ranges or where no agglomerate particle is contained, there is a possibility that the effects of the present invention may be difficult to exert. By obtaining such an aqueous-liquid-absorbing agent containing the agglomerate particles, it becomes easy to obtain the aqueous-liquid-absorbing agent excellent in the absorption rate, the water absorption capacity, the saline flow conductivity, and the wet porosity.

The hydropolymer obtained by the polymerization is favorably dried after having favorably been processed by the above step of extruding the hydropolymer from the perforated structure having perforation diameters in the range of 0.3 to 18 mm to thus pulverize the hydropolymer to thereby obtain the pulverized hydropolymer particles. After this drying, favorably, further pulverization is carried out.

Conditions for pulverizing the hydropolymer or the pulverized hydropolymer particles (favorably, after having dried it) are not especially limited. However, for example, hitherto known pulverizers (e.g. roll mills, hammer mills) are usable. The shape obtained by the pulverization is favorably an irregularly pulverized shape and, more favorably, particles of an agglomerated shape having a large surface area are partly contained.

The water-absorbent resin particles, usable in the present invention, are, for example, further processed by such as classification, whereby the weight-average particle diameter is favorably adjusted (regulated) in the range of 150 to 850 μm, more favorably 150 to 600 μm, more favorably 150 to 500 μm, more favorably 200 to 400 μm, still more favorably 250 to 380 μm. In addition, the logarithmic standard deviation ($\sigma\zeta$) is favorably adjusted (regulated) in the range of 0.1 to 0.45, more favorably 0.2 to 0.45, still more favorably 0.25 to 0.40, still more favorably 0.3 to 0.35. By adjusting (regulating) the weight-average particle diameter and the logarithmic standard deviation ($\sigma\zeta$) in this way as to the water-absorbent resin particles usable in the present invention, the effects of the present invention can still more be exerted.

In the present invention, in the case where the classification is carried out as the need arises, the sieve used in this classification needs to be selected with consideration given to the classification efficiency. For example, in the case where the water-absorbent resin particles or aqueous-liquid-absorbing agent which passes through a sieve of 150 μm in mesh opening size is removed by the classification operation, the particles of not larger than 150 μm in particle diameter are difficult to entirely remove, and it is therefore favorable that the type of the sieve to be used is selected appropriately for obtaining the water-absorbent resin particles or aqueous-liquid-absorbing agent having the objective particle diameters.

For still more exerting the effects of the present invention, it is favorable that the water-absorbent resin particles usable in the present invention include particles having particle diameters in the range of 150 to 850 μm in an amount of 90 to 100 weight %. Also, it is favorable that the water-absorbent resin particles usable in the present invention include particles having particle diameters in the range of 150 to 600 μm in an amount of 90 to 100 weight %, particularly favorably 95 to 100 weight %. It is still more favorable that the water-absorbent resin particles usable in the present invention include particles having particle diameters in the range of 150 to 500 μm in an amount of 90 to 100 weight %, particularly favorably 95 to 100 weight %. In the case where particles of smaller than 150 μm in particle diameter are included in a large amount, there is a possibility that the liquid permeability may be so poor as to result in failure to sufficiently exert the effects of the present invention. In the case where particles of larger than 850 μm in particle diameter are included in a large amount, there is a possibility that, on the occasion of the practical use, for example, an unpleasant feeling may be given to human bodies during the contact therewith.

(2-5) Surface-Crosslinking Step

In the process for production of an aqueous-liquid-absorbing agent according to the present invention, the water-absorbent resin particles are subjected to surface-crosslinking for still more exerting the effects of the present invention. The surface-crosslinking step is carried out in at least one stage selected from among before, simultaneously with, and after the step of subjecting the water-absorbent resin particles to the later-described liquid permeability enhancing treatment step. However, in view of still more exerting the effects of the present invention, the surface-crosslinking step is favorably carried out before the liquid permeability enhancing treatment step.

Examples of the surface-crosslinking agent usable for the surface-crosslinking treatment include: organic surface-crosslinking agents which have at least two functional groups reactable with a functional group (particularly, a carboxyl group) of the water-absorbent resin particles; multivalent metal compounds; and polycations. Examples thereof include: polyhydric alcohol compounds (e.g. ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol); epoxy compounds (e.g. ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol); polyamine compounds (e.g. ethylenediamine, diethylenetriamine, triethylenetetramine, tetraethylenepentamine, pentaethylenehexamine, and polyethylenimine) and their inorganic or organic salts (e.g. azetidinium salts); polyisocyanate compounds (e.g. 2,4-tolylene diisocyanate and hexamethylene diisocyanate); polyoxazoline compounds (e.g. 1,2-ethylenebisoxazoline); carbonic acid derivatives (e.g. urea, thiourea, guanidine, dicyandiamide, 2-oxazolidinone); alkylene carbonate compounds (e.g. 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one); haloepoxy compounds (e.g. epichlorohydrin, epibromohydrin, and α-methylepichlorohydrin) and their polyamine-added products (e.g. Kymene (registered trademark) produced by Hercules); silane coupling agents (e.g. γ-glycidoxypropyltrimethoxysilane and γ-aminopropyltriethoxysilane); oxetane compounds (e.g. 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, 3-butyl-3-oxetaneethanol, 3-chloromethyl-3-methyloxetane, 3-chloromethyl-3-ethyloxetane, and polyoxetane compounds); and multivalent metal compounds (e.g. hydroxides and chlorides of such as zinc, calcium, magnesium, aluminum, iron and zirconium). These surface-crosslinking agents may be used either alone respectively or in combinations with each other. Above all, it is more preferable to use a surface crosslinking agent which forms a covalent bond with a functional group (carboxyl group) on the surface of the water-absorbent resin particles because it can enhances the performance of absorbency against pressure. The polyhydric alcohols are favorable, because they are high in safety and can enhance the hydrophilicity of water-absorbent resin particle surfaces. In addition, the use of the polyhydric alcohols enhances the affinity of water-absorbent resin particle surfaces to the multivalent metal particles, so that interactions between the polyhydric alcohol residue and the multivalent metal surface enable more uniform existence of the multivalent metal particles on surfaces of the water-absorbent resin particles.

Although depending upon compounds as used, their combination, and others, the amount of the surface-crosslinking agent, as used, is favorably in the range of not less than 0.001 and not more than 10 weight parts, more favorably in the range of not less than 0.01 and not more than 5 weight parts, per 100 weight parts of the water-absorbent resin.

When the surface-crosslinking agent and the water-absorbent resin are mixed together, water may be used. The amount of water, as used, is favorably larger than 0.5 but not larger than 10 weight parts, more favorably in the range of 1 to 5 weight parts, per 100 weight parts of the solid content of the water-absorbent resin.

When the surface-crosslinking agent and/or its aqueous solution is mixed, a hydrophilic organic solvent and/or a third substance may be used as a mixing assistant.

In the case where the hydrophilic organic solvent is used, its examples include: lower alcohols (e.g. methyl alcohol, ethyl alcohol, n-propyl alcohol, isopropyl alcohol, n-butyl alcohol, isobutyl alcohol, and t-butyl alcohol); ketones (e.g. acetone); ethers (e.g. dioxane, tetrahydrofuran, and methoxy (poly)ethylene glycol); amides (e.g. ε-caprolactam and N,N-dimethylformamide); sulfoxides (e.g. dimethyl sulfoxide); and polyhydric alcohols (e.g. ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol). Incidentally, the polyhydric alcohols may be used as crosslinking agents by appropriately selecting the temperature and time, or as solvents without being made to react at all, or as both.

Though depending on such as kind, particle diameters, and water content of the water-absorbent resin particles, the amount of the hydrophilic organic solvent as used is favorably not larger than 10 weight parts, more favorably in the range of 0.1 to 5 weight parts, per 100 weight parts of the solid content of the water-absorbent resin particles. In addition, as the third substance, there may be caused to coexist those which are disclosed in EP 0668080, such as inorganic acids, organic acids, and polyamino acids. These mixing assistants may act as surface-crosslinking agents, but are favorably those which do not give surface-crosslinked water-absorbent resin particles having low water absorption performance. Particularly, volatile alcohols having boiling points of lower than 150° C. are desirable in that they volatilize during the surface-crosslinking treatment and thus their residues do not remain.

When the water-absorbent resin particles and the surface-crosslinking agent are mixed together, there may be caused to coexist a noncrosslinkable water-soluble inorganic base (favorably, alkaline metal salts, ammonium salts, alkaline metal hydroxides, and ammonia or its hydroxide) and/or an nonreducible alkaline-metal-salt pH buffer (favorably such as hydrogencarbonates, dihydrogenphosphates, and hydrogenphosphates) for the purpose of more uniformly mixing the water-absorbent resin particles and the surface-crosslinking agent together. The amount of these materials, as used, depends upon such as type or particle diameters of the water-absorbent resin particles, but is favorably in the range of 0 to 10 weight parts, more favorably 0.05 to 5 weight parts, per 100 weight parts of the solid content of the water-absorbent resin.

Although not especially limited, the method for mixing the water-absorbent resin particles and the surface-crosslinking agent together can be exemplified by such as: a method in which the water-absorbent resin particles are immersed into the hydrophilic organic solvent and then mixed with the surface-crosslinking agent that is, if necessary, dissolved in water and/or a hydrophilic organic solvent; and a method in which the surface-crosslinking agent that is dissolved in water and/or the hydrophilic organic solvent is spraywise or dropwise added directly to the water-absorbent resin particles to mix them together. In addition, in the case where the surface-crosslinking agent solution is sprayed, the size of liquid droplets being sprayed is favorably in the range of 1 to 300 μm, more favorably 2 to 200 μm.

After the mixing of the water-absorbent resin particles and the surface-crosslinking agent, usually, a heating treatment is favorably carried out to conduct the crosslinking reaction. Though depending on the surface-crosslinking agent as used, the temperature of the above heating treatment is favorably in the range of 40 to 250° C., more favorably 150 to 250° C. In the case where the treatment temperature is lower than 40° C., the absorption properties such as absorbency against pressure are sometimes not sufficiently improved. In the case where the treatment temperature is higher than 250° C., the deterioration of the water-absorbent resin particles is sometimes caused, so that the performance is lowered, therefore caution is needed. In the case where oil or steam is used as a heat medium, the temperature of the above heating treatment is a temperature of the heat medium. On the other hand, in the case where electron irradiation or other means is used for drying without using the heat medium, the temperature of the above heating treatment is a temperature of the material (object to be dried). The duration of the heating treatment is favorably in the range of 1 minute to 2 hours, more favorably 5 minutes to 1 hour.

(2-6) Liquid Permeability Enhancing Treatment Step

The process for production of an aqueous-liquid-absorbing agent according to the present invention favorably includes the liquid permeability enhancing treatment step for subjecting the water-absorbent resin particles to treatment for liquid permeability enhancement. The liquid permeability enhancing treatment step may be carried out at any time of before, simultaneously with, or after the surface-crosslinking step. However, for more exerting the effects of the present invention, it is favorable that the liquid permeability enhancing treatment step is carried out after the surface-crosslinking step and separately therefrom. The treatment for liquid permeability enhancement is not particularly limited if it is treatment for enhancing liquid permeability of the water-absorbent resin particles. However, the treatment for liquid permeability enhancement is favorably carried out by adding a liquid-permeability-enhancing agent.

The liquid-permeability-enhancing agent is more favorably a water-soluble multivalent metal compound or water-soluble polycationic compound, still more favorably a water-soluble multivalent metal compound, especially favorably at least one compound selected from among the groups consisting of compounds having aluminum compounds, zirconium compounds, titanium compounds, and compounds having an amino group. Specifically, examples of the liquid-permeability-enhancing agent includes the ones exemplified in Section (1-2). In addition, the liquid-permeability-enhancing agent is favorably water-soluble because it can be easily added more uniformly over the entire surface of the water-absorbent resin without demixing and other demerits.

The liquid-permeability-enhancing agent is used in an amount of favorably 0.001 to 10 weight %, more favorably 0.01 to 5 weight %, relative to the water-absorbent resin particles.

The method for adding the liquid-permeability-enhancing agent is not especially limited. It may be dry-blend, or the liquid-permeability-enhancing agent may be added in the form of an aqueous solution, or the addition method may be carried out by heat-fusion.

More specifically, the dry-blend is a method in which the water-absorbent resin particles are uniformly mixed with the above liquid-permeability-enhancing agent (which is solid and powdery) (e.g. the multivalent metal compound or inorganic fine particles) after having been dried and pulverized. If necessary, after this mixing, water or an aqueous polyhydric alcohol solution may further be added and mixed, and further, heating may be carried out. The "addition in the form of an aqueous solution" is a method in which an aqueous solution of such as the multivalent metal compound or polycationic compound or a dispersion liquid of such as the multivalent metal compound or polycationic compound is added to the water-absorbent resin particles to mix them together. The higher the concentration of the multivalent metal compound or polycationic compound is, the more favorable it is. In addition, after the mixing, heating may be carried out, if necessary. The heat-fusion is a method in which: the heating is carried out at the same time as or after mixing the multivalent metal hydrate (e.g. aluminum sulfate, potassium alum, ammonium alum, sodium alum) and the water-absorbent resin particles together; or the water-absorbent resin particles having been preheated are mixed with the multivalent metal compound; whereby the multivalent metal hydrate is fused and then made to adhere to the water-absorbent resin particles. If necessary, water may be added before the heating.

The process for production of an aqueous-liquid-absorbing agent of the present invention is realized by combining the above-mentioned steps appropriately. Examples of the process include the following Processes 1 through 3.

<Process 1>

A process in which after an aqueous monomer solution is polymerized in the presence of the internal-crosslinking agent in the specific amount, the resultant hydropolymer is extruded from a perforated structure having specific perforation diameters to thus pulverize the hydropolymer, and the resultant pulverized gel is dried.

<Process 2>

A process in which after an aqueous monomer solution is polymerized in the presence of the internal-crosslinking agent in the specific amount and blowing agent, the resultant hydropolymer is pulverized, and the resultant pulverized gel is dried.

<Process 3>

A process in which after an aqueous monomer solution is polymerized in the presence of the internal-crosslinking agent in the specific amount, the resultant hydropolymer is pulverized, and the resultant pulverized gel is dried and then agglomerated.

In these processes 1 through 3, the pulverized gel is favorably agglomerate particles. Further, favorably surface-crosslinking and addition of the liquid-permeability-enhancing agent are carried out after drying. Still further, favorably, polymerization is carried out with an aqueous solution of a specific high concentration.

WORKING EXAMPLES

Hereinafter, the present invention is more specifically illustrated by the following Examples of some preferred embodiments in comparison with Comparative Examples not according to the present invention. However, the present invention is not limited to them. Hereinafter, for convenience, the units "weight part(s)" and "liter(s)" may be referred to simply as "part(s)" and "L" respectively. In addition, the unit "weight %" may be referred to as "wt %".

The measurement and evaluation methods in the Examples and the Comparative Examples are shown below.

In addition, unless otherwise noted, the following measurement and evaluation are stated as having been carried out under conditions of a room temperature (25° C.) and a humidity of 50 RH %.

Incidentally, the following statement is made on the assumption that the water-absorbent resin (particles) or aqueous-liquid-absorbing agent is measured. In addition, in the case where a commercially available water-absorbent resin or a water-absorbent resin separated from a diaper is measured, it is measured after having appropriately been dried under a reduced pressure (e.g. at 60 to 80° C. for 16 hours) so as to have a solid content of 90 to 100 weight %.

(a) Water Absorption Capacity (CRC: Centrifuge Retention Capacity)

An amount of 0.200 g of water-absorbent resin or aqueous-liquid-absorbing agent was uniformly placed into a bag (60 mm×60 mm) made of nonwoven fabric (trade name: Heatron Paper, type: GSP-22, produced by Nangoku Pulp Kogyo Co., Ltd.) and then immersed into a physiological saline solution (hereinafter the physiological saline solution all refers to a 0.9 weight % aqueous sodium chloride solution) of which the temperature had been adjusted to 25° C. After 30 minutes, the bag was pulled up and then drained of water by a centrifugal force of 250 G with a centrifugal separator (produced by Kokusan Co., Ltd., centrifugal separator: model H-122) for 3 minutes, and then the weight W1 (g) of the bag was measured. In addition, the same procedure as the above was carried out without the aqueous-liquid-absorbing agent, and the resultant weight W0 (g) was measured. Then, the CRC (g/g) was calculated from these W1 and W0 in accordance with the following equation:

CRC (g/g)=[($W_1$ (g)−$W_0$ (g))/weight (g) of water-absorbent resin]−1

(b) Absorbency Against Pressure (AAP)

The absorbency against pressure (AAP) refers to an absorbency against pressure for a physiological saline solution (0.9 weight % aqueous sodium chloride solution) under a load of 4.83 kPa in 60 minutes.

The measurement was carried out with an apparatus as shown in FIG. 1.

A stainless metal gauze 101, which was a screen of 400 meshes (mesh opening size: 38 μm), was fused to a bottom of a plastic supporting cylinder 100 having an inner diameter of 60 mm. Then, under conditions of a room temperature (23.0±2.0° C.) and a humidity of 50 RH %, onto the above metal gauze, there was uniformly spread 0.90 g of aqueous-liquid-absorbing agent 102, and further thereon, there were mounted a piston 103 and a load 104 in sequence, wherein the piston had an outer diameter of only a little smaller than 60 mm and made no gap with the inner wall surface of the supporting cylinder, but was not hindered from moving up and down, and wherein the piston and the load were adjusted so that a load of 4.83 kPa (0.7 psi) could uniformly be applied to the aqueous-liquid-absorbing agent. Then, the weight Wa (g) of the resultant one set of measurement apparatus was measured.

A glass filter plate 106 having a diameter of 90 mm (produced by Sogo Rikagaku Glass Seisakusho Co., Ltd., pore diameter: 100 to 120 μm) was mounted inside a Petri dish 105 having a diameter of 150 mm, and then a physiological saline solution (0.9 weight % aqueous sodium chloride solution) 108 (20 to 25° C.) was added up to the same level as the upside of the glass filter plate, on which a filter paper 107 having a diameter of 90 mm (produced by ADVANTEC Toyo Co., Ltd., trade name: (JIS P 3801, No. 2), thickness: 0.26 mm, diameter of captured particles: 5 μm) was then mounted so that its entire surface would be wetted, and further, an excess of liquid was removed.

The one set of measurement apparatus was mounted on the above wet filter paper, thereby getting the liquid absorbed under the load for a predetermined duration. This absorption duration was defined as 1 hour from the start of the measurement. Specifically, 1 hour later, the one set of measurement apparatus was removed by being lifted to measure its weight Wb (g). This measurement of the weight must be carried out as quickly as possible and so as not to give any vibration. Then, the absorbency against pressure (AAP) (g/g) was calculated from the Wa and Wb in accordance with the following equation:

AAP (g/g)=[$Wb$ (g)−$Wa$ (g)]/weight (g) of aqueous-liquid-absorbing agent (c) Absorption Rate (FSR: Free Swell Rate)

An amount (unit: g) ($W_A$) (calculated from the below-mentioned equation (a)) of aqueous-liquid-absorbing agent was weighed out precisely to the fourth decimal place. This aqueous-liquid-absorbing agent as weighed out was placed into a 25 ml glass beaker (diameter: 32-34 mm, height: 50 mm), when the upside of the aqueous-liquid-absorbing agent as placed into the beaker was made horizontal. If necessary, a treatment such as of cautiously tapping the beaker may be carried out to make the surface of the aqueous absorbing agent horizontal. Next, 20 ml of physiological saline solution (0.9 weight % aqueous sodium chloride solution), of which the temperature had been adjusted to 23.0±2.0° C., was weighed out into a 50 ml glass beaker, and then the weight (unit: g) was measured to the fourth decimal place ($W_1$). Then, the physiological saline solution as weighed out was carefully and quickly poured into the 25 ml beaker containing the aqueous-liquid-absorbing agent. The time measurement was started at the same time as when the poured physiological saline solution contacted with the aqueous-liquid-absorbing agent. Then, the upside of the physiological saline solution in the beaker into which the physiological saline solution had been poured was observed at an angle of about 20° with the eye. Then, the time measurement was ended when the upside, which had been the liquid surface of the physiological saline solution at the start, had been replaced by the surface of the aqueous-liquid-absorbing agent (having absorbed the physiological saline solution) as a result of the absorption of the physiological saline solution into the aqueous-liquid-absorbing agent (unit: sec) ($t_s$). Next, the weight (unit: g) of the physiological saline solution, which remained attaching to the 50 ml beaker after the pouring of the physiological saline solution, was measured to the fourth decimal place ($W_2$). The weight ($W_F$, unit: g) of the poured physiological saline solution was determined from the equation (b) below.

The water absorption rate (FSR) was calculated from the equation (c) below.

$W_A$ (g)=20 (g)/(0.75×CRC (g/g))      Equation (a)

$W_F$ (g)=$W_1$ (g)−$W_2$ (g)      Equation (b)

FSR (g/g/s)=$W_F$/($t_s$×$W_A$)      Equation (c)

The same measurement was carried out repeatedly three times per one sample. The measurement result was defined as the average value of the three-time-measured values.

(d) Saline Flow Conductivity (SFC)

(SFC Measurement Apparatus)

This measurement is to measure the saline flow conductivity (SFC) of a gel layer formed in an aqueous-liquid-absorbing agent which has absorbed the physiological saline solution under load and thereby swollen.

This measurement of the saline flow conductivity (SFC) uses Darcy's law and the stationary-flow method (e.g. refer to "Absorbency", edited by P. K. Chatterjee, Elsevier 1985, pp. 42-43 and Chemical Engineering, Vol. II, 3rd edition, J. M. Coulson and J. F. Richarson, Pergamon Press, 1978, pp. 125-127).

Figure 2:
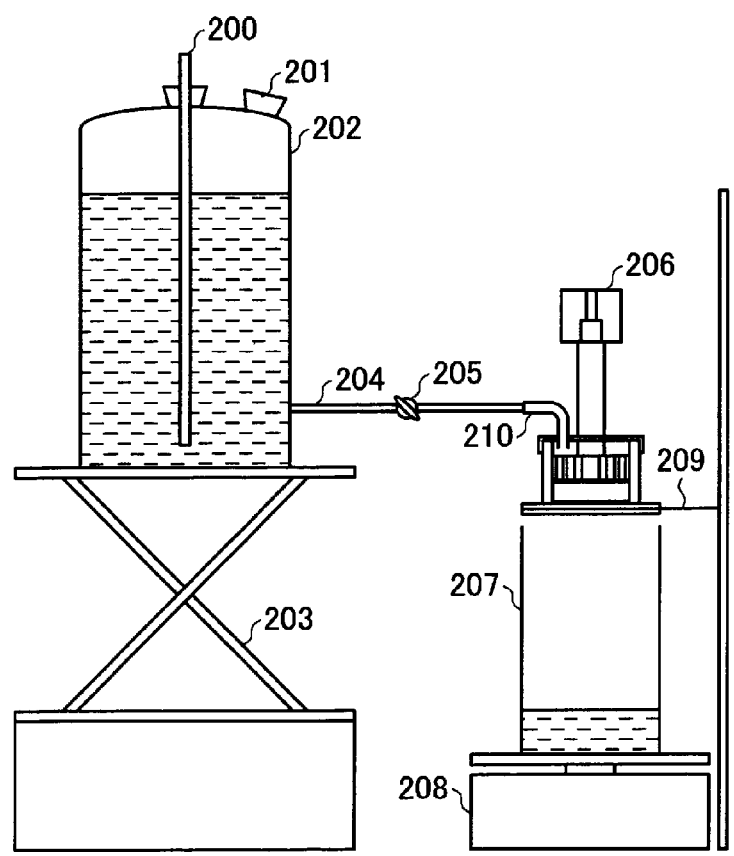
FIG. 2 is a schematic sectional view of a measurement apparatus as used for measuring the SFC.

An apparatus favorable for this measurement is illustrated in FIG. 2. This apparatus has a storage tank (202) of about 5 L in capacity as put on a laboratory jack (203). The storage tank (202) has an end-open glass tube and a rubber stopper part (200) which have been provided thereto in order to obtain a function of keeping the hydrostatic height constant. To the storage tank (202), there can be added a liquid by removing a rubber stopper part (201). The storage tank (202) has an liquid outlet therein below the liquid surface, and a glass tube (204) having a valve (205) is connected to this outlet. The liquid feed can be controlled by opening and closing the valve (205). The glass tube (204) is connected to a flexible tube (210). The other end of the flexible tube (210) is set so as to feed a liquid to an SFC instrument (206) as illustrated in its entirety. The SFC instrument (206) was set on a support (209) having a stainless wire mesh of 1 mm in mesh opening size. Under the support (209), there is disposed a collection tank (207) for liquid collection. The collection tank (207) is disposed on a balance (208). The balance (208) is wired to a computer so that the mass of the collected liquid can be taken in every definite time.

Incidentally, in FIG. 2, in order to facilitate the understanding of this drawing figure, the right-hand apparatus (e.g. SFC instrument 206, collection tank 207, balance 208, support 209) is illustrated on a scale enlarged in comparison with the reduced scale of the left-hand apparatus.

Figure 3:
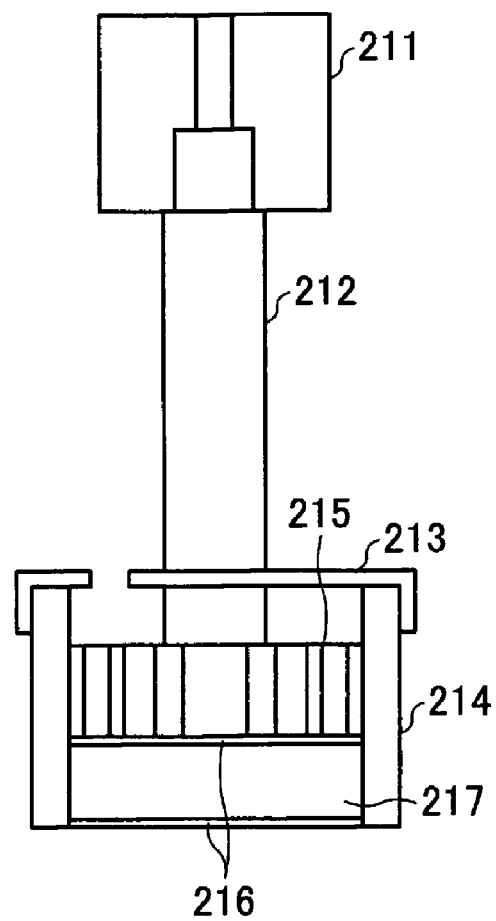
FIG. 3 is a schematic sectional view of a portion of the measurement apparatus as used for measuring the SFC.
Figure 4:
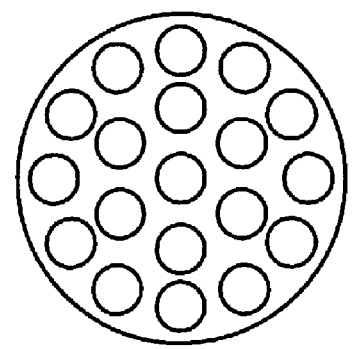
FIG. 4 is a bottom view of a piston head of the measurement apparatus as used for measuring the SFC.

As to FIG. 3, the SFC instrument basically includes: a cylinder (214) (obtained by processing LEXAN® or its equivalent) having a stainless wire mesh at the bottom; a piston (212) (obtained by processing LEXAN® or its equivalent); a cover (213) (obtained by processing LEXAN® or its equivalent) having an opening for insertion of the liquid-feeding tube; and a weight (211). The piston (212) has a piston head (215) through which holes are made as illustrated in FIG. 3. The holes of the piston head (215) have the cylindrical structure which is penetrating in upside and downside directions of the piston head (215) as illustrated in FIG. 4. On the bottom of the piston head (215), there is stuck a wire mesh (216) of 400 meshes (mesh opening size: 38 μm) (produced by Weisse & Eschrich, material: SUS 304, mesh opening width: 0.038 mm, wire diameter: 0.025 mm). The piston head (215) has a diameter only a little smaller than the inner diameter of the cylinder (214) and has such a size as allows the piston head (215) to smoothly migrate inside the cylinder (214) without being hindered from moving up and down. The top end of the shaft of the piston (212) is processed so that the weight can be set there. The cylinder (214) has an inner diameter of 6.00 cm (bottom area 28.27 cm2), a wall thickness of 0.5 cm, and a height of 6.0 cm. On the bottom of the cylinder (214), there is stuck a wire mesh (216) of 400 meshes (mesh opening size: 38 μm) (produced by Weisse & Eschrich, material: SUS 304, mesh opening width: 0.038 mm, wire diameter: 0.025 mm). The cover (213) has a hole of a size only a little larger than the external form of the shaft of the piston (212) so that the shaft of the piston (212) can smoothly migrate without being hindered from moving up and down. In addition, the cover (213) has the opening for insertion of the liquid-feeding tube. The total weight of the weight (211) and the piston (212) is adjusted so that a load of 2.07 kPa (0.3 psi) can be applied to the bottom of the cylinder.

(SFC measurement method)

First of all, the height ($h_0$: unit=mm, number of significant figures=4) and weight ($W_0$: unit=g, number of significant figures=4) of the SFC instrument, including the cylinder (214), the piston (212), the cover (213), and the weight (211), were measured before the aqueous-liquid-absorbing agent 217 was placed into it, in other words, in an empty state. Next, 3.00±0.05 g of aqueous-liquid-absorbing agent was weighed out (W: unit=g, number of significant figures=4). The amount of the aqueous-liquid-absorbing agent being weighed out is favorably adjusted so that the below-mentioned "d final" will be in the range of 10 to 20 mm, more preferably 15 to 20 mm. For example, in the case where the water absorption capacity (CRC) is in the range of 5 to 16 g/g, the amount of the aqueous-liquid-absorbing agent being weighed out is adjusted to 3.00±0.05 g. In the case where the water absorption capacity (CRC) is in the range of above 16 to 20 g/g, the amount of the aqueous-liquid-absorbing agent being weighed out is adjusted to 2.00±0.03 g. In the case where the water absorption capacity (CRC) is in the range of above 20 to 25 g/g, the amount of the aqueous-liquid-absorbing agent being weighed out is adjusted to 1.60±0.03 g. Note that the amount of the aqueous-liquid-absorbing agent being weighed out is favorably adjusted so that the below-mentioned "d final" will be in the above range. The weighed-out aqueous-liquid-absorbing agent 217 was placed on the entire bottom of the cylinder (214) so as to carefully and uniformly be dispersed there. Thereafter, the piston (212), the cover (213), and the weight (211) are set to measure the height ($h_1$: unit=mm) of the SFC instrument. Next, a physiological saline solution (0.9 weight % aqueous sodium chloride solution) was added into a Petri dish of at least 16 cm in diameter and at least 4 cm in height so that the SFC instrument could be immersed by at least 3 cm from its bottom. A filter paper of 90 mm in diameter (filter paper produced by ADVANTEC Co., Ltd.: No.2) was laid on the inner bottom of the Petri dish. The SFC instrument containing the aqueous-liquid-absorbing agent was mounted on the filter paper to swell the aqueous-liquid-absorbing agent for 60 minutes. After the aqueous-liquid-absorbing agent had been swollen for 60 minutes in this way, the SFC instrument was removed from the Petri dish to measure the height ($h_2$: unit=mm, number of significant figures=4) and weight ($W_2$: unit=g, number of significant figures=4) of the SFC instrument. Thereafter, the SFC instrument was moved and set onto the support (209) of the SFC measurement apparatus, and the flexible tube (210) was set into the insertion opening. Next, the valve (205) was opened to thereby start feeding the liquid. After this start of the liquid feeding, the hydrostatic height in the cylinder was adjusted so as to be kept at 5 cm until the amount (indicated by the balance) of the liquid, having passed through the gel layer and then been collected, reached about 200 g. This adjustment may be carried out either by adjusting the height of the laboratory jack (203) or by adjusting the height of the lower portion of the glass tube as inserted from the upper portion of the storage tank (202). When the hydrostatic height in the cylinder had been adjusted so as to be kept at 5 cm, then the weight data of the liquid, having passed through the gel layer and then been collected, started to be taken in by the computer as connected with the balance. The data intake was carried out every 5 sec until 180 sec. However, if the amount of the collected liquid reached not smaller than 2 kg within 180 sec after the start of the data intake, then, at that point of time (e.g. 120 sec), the data intake was ended. After the end of the data intake, the valve (205) was quickly closed. Thereafter, when the liquid had almost come not to flow down from the bottom of the cylinder (214) of the SFC instrument (when the hydrostatic height in the cylinder (214) had agreed with the height of the gel layer), the height ($h_3$: unit=mm, number of significant figures=4) of the SFC instrument was measured. Thereafter, the SFC instrument was moved onto a cylindrical instrument (having the same inner diameter as of the cylinder of the SFC instrument) to drip water off for 30 minutes. This operation is to put the SFC instrument on the cylindrical instrument to thereby make the dripping-off of water carried out favorably in a state where the bottom of the wire mesh, on which the aqueous-liquid-absorbing agent in the cylinder is disposed, is not in direct contact with anything. After the dripping-off of water had been carried out for 30 minutes in the above way, the height ($h_4$: unit=mm, number of significant figures=4) and weight ($W_4$: unit=g, number of significant figures=4) of the SFC instrument were measured.

(Calculation of SFC)

The data as taken in by the computer were plotted on a graph by indicating the time t (sec) as the X-axis and the weight (g) of the collected liquid as the Y-axis. The resultant plots were approximated to a straight line by the method of least squares, and then the rate (unit: g/s) of this straight line was determined.

The SFC was determined from the following equation:

$$\text{SFC (cm}^3 \cdot \text{s} \cdot 10^{-7}/\text{g}) = (d\text{ final} \times \text{rate})/(\text{Area} \times \text{Density} \times \text{Pressure}) \times 10{,}000{,}000$$

wherein:

Area (cm$^2$)=28.27

Density (g/cm$^3$)=1.005 (the density of the 0.9 weight % physiological saline solution at 20° C. is used)

d final (cm)={($h_2-h_0$)+($h_3-h_0$)}/2/10

(e) Wet Porosity

The measurement of the wet porosity is carried out subsequently to the measurement of the saline flow conductivity (SFC).

A five-ply filter paper (10 cm×10 cm, produced by Ahlstrom, Grade: 989) was set on a horizontal experimental stand. Then, the SFC instrument having been subjected to the dripping-off of water for 30 minutes was put on the above five-ply filter paper for 10 minutes. Thereafter, the SFC instrument was moved onto a separately prepared new five-ply filter paper of the same as the aforementioned. After 16±2 hours, the height ($h_5$: unit=mm) and weight ($W_5$: unit=g) of the SFC instrument were measured. Incidentally, the specifications of the aforementioned filter papers are described in the EDANA strikethrough test.

The wet porosity was calculated from the following equation:

Wet Porosity (unit: %)=[($W_3-W_4$-0.7)/{$h_4-h_0$}× 28.27]]×100

(f) Particle Diameters

Water-absorbent resin particles or aqueous-liquid-absorbing agents, having been pulverized, were classified with JIS standard sieves having mesh opening sizes of 850 μm, 710 μm, 600 μm, 500 μm, 425 μm, 300 μm, 212 μm, 150 μm, and 45 μm. Then, the percentages R of the residues on these sieves were plotted on a logarithmic probability paper. Therefrom, the weight-average particle diameter (D50) was read. Note that in the case where sizes of the water-absorbent resin particles or aqueous-liquid-absorbing agents exceed 850 μm, commercial JIS standard sieves having mesh opening sizes exceeding 850 μm are used appropriately.

(g) Logarithmic Standard Deviation (σζ) of Particle Diameter Distribution

Water-absorbent resin particles or aqueous-liquid-absorbing agents were classified with JIS standard sieves having mesh opening sizes of 850 μm, 710 μm, 600 μm, 500 μm, 425 μm, 300 μm, 212 μm, 150 μm, and 45 μm. Then, the percentages R of the residues on these sieves were plotted on a logarithmic probability paper. Note that in the case where sizes of the water-absorbent resin particles or aqueous-liquid-absorbing agents exceed 850 μm, commercial JIS standard sieves having mesh opening sizes exceeding 850 μm are used appropriately. Thus, if X1 is defined as a particle diameter when R=84.1 weight %, and if X2 is defined as a particle diameter when R=15.9 weight %, then the logarithmic standard deviation (σζ) is shown by the following equation. The smaller σζ value shows the narrower particle diameter distribution.

σζ=0.5×ln(*X2/X1*)

As to the classification method for measuring the particle diameters and the logarithmic standard deviation (σζ) of the particle diameter distribution, 10.0 g of water-absorbent resin particles or aqueous-liquid-absorbing agent was placed onto JIS standard sieves (having mesh opening sizes of 850 μm, 710 μm, 600 μm, 500 μm, 425 μm, 300 μm, 212 μm, 150 μm, and 45 μm) (THE IIDA TESTING SIEVE: diameter=8 cm) and then classified with a shaking classifier (IIDA SIEVE SHAKER, TYPE: ES-65 type, SER. No. 0501) for 5 minutes.

(h) Bulk Density

The bulk density of the water-absorbent resin particles or aqueous-liquid-absorbing agent was measured by the method as described in edana 460.1-99.

(i) Extractable Component Content

Into a plastic receptacle of 250 ml in capacity having a lid, 184.3 g of physiological saline solution (0.9 weight % aqueous sodium chloride solution) was weighed out. Then, 1.00 g of water-absorbent resin or aqueous-liquid-absorbing agent was added to this aqueous solution, and they were stirred for 16 hours, thereby extractable components were extracted from the resin. The resultant extract liquid was filtrated with a filter paper (produced by ADVANTEC Toyo Co., Ltd., trade name: (JIS P 3801, No. 2), thickness: 0.26 mm, diameter of captured particles: 5 μm), and then 50.0 g of the resultant filtrate was weighed out and used as a measuring solution.

To begin with, only the physiological saline solution was firstly titrated with an aqueous 0.1N NaOH solution until the pH reached 10, and then the resultant solution was titrated with an aqueous 0.1N HCl solution until the pH reached 2.7, thus obtaining blank titration amounts ([bNaOH] ml and [bHCl] ml).

The same titration procedure was carried out also for the measuring solution, thus obtaining titration amounts ([NaOH] ml and [HCl] ml).

For example, if the water-absorbent resin comprised acrylic acid and its sodium salt in known amounts, the extractable component content of the water-absorbent resin was calculated from the average molecular weight of the monomers and the titration amounts, as obtained from the above procedures, in accordance with the following equation. In the case of unknown amounts, the average molecular weight of the monomers was calculated from the neutralization degree as determined by the titration.

Extractable component content (weight %)=0.1×(average molecular weight)×184.3×100×([HCl]−[bHCl])/1,000/1.0/50.0

Neutralization degree (mol %)=[1−([NaOH]−[bNaOH])/([HCl]−[bHCl])]×100

Example 1

In a reactor as formed by lidding a jacketed stainless twin-arm kneader of 10 liters in capacity having two sigma-type blades, there was prepared a reaction liquid by dissolving 52.63 g (0.4 mol %) of polyethylene glycol diacrylate and 18.33 g (0.4 mol %) of D-sorbitol into 5,367.3 g of aqueous solution of sodium acrylate having a neutralization degree of 60 mol % (monomer concentration: about 40 weight %). Next, this reaction liquid was deaerated under an atmosphere of nitrogen gas for 20 minutes. Subsequently, 30.19 g of 10 weight % aqueous sodium persulfate solution and 25.16 g of 0.1 weight % aqueous L-ascorbic acid solution were added thereto under stirred conditions. As a result, polymerization started after about 1 minute. Then, the polymerization was carried out in the range of 20 to 95° C. while the forming gel was pulverized. Then, the resultant hydropolymer was got out after 30 minutes from the start of the polymerization. The resultant hydropolymer was in the form of divided small pieces having diameters of not larger than about 5 mm.

The resultant hydropolymer was pulverized and agglomerated with a screw extruder (produced by Hiraga Kosakusho, Chopper, MODEL: TB-32, perforation diameter of perforated plate=9.5 mm, thickness of perforated plate=5.0 mm, number of revolutions of screw=32.5 rpm), thus obtaining pulverized hydropolymer particles having been divided into small pieces. Incidentally, the hydropolymer was supplied at 1300 g/minute.

The resultant pulverized hydropolymer particles having been divided into small pieces were spread onto a metal gauze of 50 meshes (opening size: 300 μm) and then dried with hot air of 180° C. for 40 minutes. Next, the dried product was pulverized with a roll mill and then classified with JIS standard sieves having a mesh opening size of 600 μm and 150 μm, thus obtaining a water-absorbent resin (having a solid content of 96 weight parts) of an irregularly pulverized shape, which had a weight-average particle diameter of 324 μm and a logarithmic standard deviation (σζ) of 0.32.

An amount of 500 weight parts of the obtained water-absorbent resin was placed into Lödige Mixer (produced by Lödige, type: M5R) and then uniformly spraywise mixed with a surface-crosslinking agent solution comprising a mixed liquid of 2.4 weight parts of 1,4-butanediol, 3.8 weight parts of propylene glycol, and 20.0 weight parts of pure water under stirring. Then, the water-absorbent resin, which had been mixed with the surface-crosslinking agent solution, was placed into a stainless reactor (diameter: about 30 cm, height: about 20 cm) having a stirrer. Then, the reactor was immersed into an oil bath (of which the temperature had been adjusted to 200° C.) to carry out heat treatment for surface-crosslinking under stirring for 35 minutes. After this heat treatment, the resultant water-absorbent resin was disintegrated to such a degree that it could pass through a JIS standard sieve having a mesh opening size of 600 μm. As a result, surface-crosslinked water-absorbent resin particles were obtained.

An amount of 100 weight parts of the resultant surface-crosslinked water-absorbent resin particles was heated to 150° C. and then uniformly mixed with 1.6 weight parts of potassium alum (potassium aluminum sulfate dodecahydrate) under stirring for 5 minutes, thus obtaining an aqueous-liquid-absorbing agent (1). The physical properties of the aqueous-liquid-absorbing agent (1) are shown in Table 1.

Example 4

An aqueous-liquid-absorbing agent (4) was obtained in the same way as of Example 1 except that: the amount of usage of polyethylene glycol diacrylate was changed to 13.16 g (0.1 mol %); the amount of usage of D-sorbitol was changed to 27.50 g (0.6 mol %); the perforation diameter of perforated plate in the screw extruder was changed to 9.5 mm; and surface-crosslinking treatment time was changed to 45 minutes. The physical properties of the aqueous-liquid-absorbing agent (4) are shown in Table 1.

Example 5

In a polypropylene-made container of 80 mm in inner diameter and 1 liter in capacity as covered with polystyrene foam being a heat insulator, a solution (A) was prepared by mixing 300 g of acrylic acid, 1.80 g of a 1.0 weight % aqueous pentasodium diethylenetriaminepentaacetate solution, 3.60 g of acrylic acid solution of IRGACURE (Registered Trademark) 184 together, and a solution (B) was prepared by mixing 209.0 g of 48.5 weight % of aqueous sodium hydroxide solution with a mixture solution of 252 g of ion-exchanged water of which the temperature had been adjusted to 50° C. and 1.53 g (0.2 mol %) of D-sorbitol together. The solution (B) was quickly added to the solution (A) being stirred with a magnetic stirrer to mix them together, thus obtaining an aqueous monomer solution (C). As to the aqueous monomer solution (C), its liquid temperature rose to about 100° C. due to the neutralization heat and the dissolution heat.

Next, 11 g of a 3 weight % aqueous sodium persulfate solution was added to this aqueous monomer solution (C).

TABLE 1

| Examples | Aqueous-liquid-absorbing agents | SFC ($\times 10^{-7}$ cm$^3 \cdot$ s/g) | CRC (g/g) | FSF (g/g/s) | Wet Porosity (%) | D50 (μm) | Ratio of 150-600 μm (wt %) |
|---|---|---|---|---|---|---|---|
| 1 | (1) | 1564 | 9.1 | 0.18 | 41.3 | 353 | 98.3 |
| 2 | (2) | 1632 | 9.2 | 0.23 | 41.9 | 321 | 98.4 |
| 3 | (3) | 1236 | 10.0 | 0.29 | 40.4 | 358 | 98.8 |
| 4 | (4) | 1671 | 8.3 | 0.20 | 42.3 | 347 | 98.5 |
| 5 | (5) | 1598 | 9.0 | 0.15 | 41.1 | 320 | 98.5 |
| 6 | (6) | 1305 | 10.5 | 0.18 | 41.6 | 355 | 98.0 |
| 7 | (7) | 1365 | 10.3 | 0.18 | 42.3 | 337 | 98.4 |

Example 2

An aqueous-liquid-absorbing agent (2) was obtained in the same way as of Example 1 except that: the perforation diameter of perforated plate in Example 1 was changed to 6.5 mm. The physical properties of the aqueous-liquid-absorbing agent (2) are shown in Table 1. Incidentally, the resultant aqueous-liquid-absorbing agent (2) had an extractable component content of 1.1 weight % and a bulk density of 5.8 g/ml.

Example 3

An aqueous-liquid-absorbing agent (3) was obtained in the same way as of Example 1 except that: the amount of usage of polyethylene glycol diacrylate was changed to 32.90 g (0.25 mol %); the amount of usage of D-sorbitol was changed to 16.04 g (0.35 mol %); the perforation diameter of perforated plate in the screw extruder was changed to 6.5 mm; and surface-crosslinking treatment time was changed to 45 min- Immediately thereafter, the resultant mixture was poured into a stainless vat type container having an inner surface as coated with Teflon (registered trademark) in an open system. Simultaneously with pouring the aqueous monomer solution into the stainless vat type container, the stainless vat type container was irradiated with ultraviolet rays by means of an ultraviolet radiation device which is placed at a height 60 cm from the bottom of the stainless vat type container.

Shortly after the above pouring of the aqueous monomer solution (C) into the vat, polymerization started. While water vapor was emitted, the polymerization proceeded. A temperature of the polymerization reached its peak within about 1 minute. After 3 minutes, the ultraviolet irradiation was stopped, and then the resultant hydropolymer was got out.

The resultant hydropolymer was pulverized with a meat chopper (MEAT-CHOPPER, Type: 12VR-400KSOX, produced by Iizuka Kogyo Co., Ltd., die perforation diameter=6.4 mm, the number of perforations=38, die thickness=8 mm), thus obtaining hydropolymer particles having been divided into small pieces.

The resultant pulverized hydropolymer particles having been divided into small pieces were spread onto a metal gauze of 50 meshes (opening size: 300 μm) and then dried with hot air of 180° C. Next, the dried product was pulverized with a (0.4 mol %) of D-sorbitol were replaced with 13.16 g (0.1 mol %) of polyethylene glycol diacrylate and 13.90 g (0.6 mol %) of glycerine; the perforation diameter of perforated plate in the screw extruder was changed to 4.5 mm; and the number of revolutions of screw was changed to 32.5 rpm. The physical properties of the comparative aqueous-liquid-absorbing agent (1) are shown in Table 2.

TABLE 2

| Comparative Examples | Comparative aqueous-liquid-absorbing agents | SFC ($\times 10^{-7}$ cm$^3 \cdot$s/g) | CRC (g/g) | FSR (g/g/s) | Wet Porosity (%) | D50 (μm) | Ratio of 150-600 μm (wt %) |
|---|---|---|---|---|---|---|---|
| 1 | (1) | 953 | 10.1 | 0.24 | 37.3 | 324 | 97.5 |
| 2 | (2) | 1000 | 12.1 | 0.34 | 39.0 | 350 | 99.9 |
| 3 | (3) | 897 | 10.0 | 0.37 | — | 353 | 98.3 | roll mill and then classified with JIS standard sieves having a mesh opening size of 600 μm and 45 μm, thus obtaining a water-absorbent resin particles (having a solid content of 96 weight parts) of an irregularly pulverized shape.

An amount of 100 weight parts of the resultant water-absorbent resin particles was uniformly spraywise mixed with a surface-crosslinking agent solution comprising a mixed liquid of 0.45 weight part of 1,4-butanediol, 0.7 weight part of propylene glycol, and 4.0 weight parts of pure water under stirring. Then, the water-absorbent resin particles, which had been mixed with the surface-crosslinking agent solution, was heat-treated for surface-crosslinking with a hot-air drying oven (temperature: 180° C.) for 1 hour. After this heat treatment, the resultant water-absorbent resin particles were disintegrated to such a degree that they could pass through a JIS standard sieve having a mesh opening size of 600 μm. As a result, surface-crosslinked water-absorbent resin particles were obtained.

An amount of 100 weight parts of the resultant surface-crosslinked water-absorbent resin particles was heated to 150° C. and then uniformly mixed with 1.6 weight parts of potassium alum (potassium aluminum sulfate dodecahydrate) under stirring for 5 minutes, thus obtaining an aqueous-liquid-absorbing agent (5). The physical properties of the aqueous-liquid-absorbing agent (5) are shown in Table 1.

Example 6

An aqueous-liquid-absorbing agent (6) was obtained in the same way as of Example 5 except that: surface-crosslinking treatment time was changed to 45 minutes. The physical properties of the aqueous-liquid-absorbing agent (6) are shown in Table 1.

Example 7

An aqueous-liquid-absorbing agent (7) was obtained in the same way as of Example 5 except that: the amount of usage of D-sorbitol was changed to 0.77 g (0.1 mol %); and surface-crosslinking treatment time was changed to 90 minutes. The physical properties of the aqueous-liquid-absorbing agent (7) are shown in Table 1.

Comparative Example 1

A comparative aqueous-liquid-absorbing agent (1) was obtained in the same way as of Example 1 except that: 52.63 g (0.4 mol %) of polyethylene glycol diacrylate and 18.33 g Comparative Example 2

A comparative aqueous-liquid-absorbing agent (2) was obtained in the same way as of Example 1 except that: 52.63 g (0.4 mol %) of polyethylene glycol diacrylate and 18.33 g (0.4 mol %) of D-sorbitol were replaced with 92.11 g (0.7 mol %) of polyethylene glycol diacrylate alone; the perforation diameter of perforated plate in the screw extruder was changed to 4.5 mm; the number of revolutions of screw was changed to 32.5 rpm; a mixture liquid of 2.4 weight parts of 1,4-butanediol, 3.8 weight parts of propylene glycol, and 20 weight parts of pure water is replaced with a mixture liquid of 2.3 weight parts of 1,4-butanediol, 4.5 weight parts of propylene glycol, and 22.5 weight parts of pure water. The physical properties of the comparative aqueous-liquid-absorbing agent (2) are shown in Table 2.

Comparative Example 3

A hydropolymer was obtained in the same way as of Example 5 except that 1.53 g (0.2 mol %) of D-sorbitol was replaced with 3.07 g (0.4 mol %) of D-sorbitol. By pulverizing and classifying the obtained hydropolymer in the same way as of Example 5, the following operations were carried out: "The resultant pulverized hydropolymer particles having been divided into small pieces were spread onto a metal gauze of 50 meshes (opening size: 300 Mm) and then dried with hot air of 180° C., and next, the dried product was pulverized with a roll mill and then classified with JIS standard sieves having a mesh opening size of 850 μm and 45 μm, thus obtaining a water-absorbent resin particles (having a solid content of 96 weight parts) of an irregularly pulverized shape".

To an amount of 100 weight parts of the resultant water-absorbent resin particles, 2.5 weight parts of cationic polymer (produced by BASF Co., Ltd., Catiofast PR8106: N-vinyl-formaldehyde/polyvinyl amine copolymer) was added to mix them together, without surface-crosslinking. Thereafter, the resultant mixture was uniformly spread onto a glass petri dish and heated with a hot-air drying oven at a temperature of 60° C. for 1 hour, thus, obtaining a comparative aqueous-liquid-absorbing agent (3). The physical properties of the comparative aqueous-liquid-absorbing agent (3) are shown in Table 2.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

In the present invention, for example, if the absorbent structures in the sanitary materials such as diapers are constituted by containing the aqueous-liquid-absorbing agent according to the present invention, then, in the uses of the sanitary materials and in other uses, the significant improvements can be done such that the sanitary materials can be thinned, because: the aqueous liquid can rapidly be absorbed, and also, the aqueous liquid can be diffused through a still wider range, and further, the aqueous liquid can be retained in an amount of not smaller than is absorbed by the aqueous-liquid-absorbing agent.

The invention claimed is:

1. An aqueous-liquid-absorbing agent containing water-absorbent resin particles as essential components and a liquid-permeability-enhancing agent, wherein the water-absorbent resin particles are obtained by a process including the step of polymerizing a water-soluble ethylenically unsaturated monomer having a carboxyl group with a neutralization degree of 45 to 85 mol %, have a crosslinked structure in their inside, and are surface-crosslinked, the aqueous-liquid-absorbing agent being characterized by exhibiting a water absorption capacity (CRC) of 5 to 25 g/g and a saline flow conductivity (SFC) of not less than 1216 $cm^3 \cdot s \cdot 10^{-7}$/g.

2. An aqueous-liquid-absorbing agent according to claim 1, wherein absorption rate (FSR) is not less than 0.1 g/g/s.

3. An aqueous-liquid-absorbing agent according to claim 1, which is a particulate shape and of which not less than 90 weight % is in the form of particles having particle diameters in the range of 150 to 850 μm.

4. An aqueous-liquid-absorbing agent according to claim 1, wherein at least a portion of the water-absorbent resin particles are agglomerate particles.

* * * * *